United States Patent
Yokoyama et al.

(10) Patent No.: US 10,629,152 B2
(45) Date of Patent: Apr. 21, 2020

(54) IMAGE SIGNAL PREPARATION CIRCUIT, IMAGE SIGNAL PREPARATION METHOD, AND RECORDING MEDIUM STORING IMAGE SIGNAL PREPARATION PROGRAM FOR DISPLAY DRIVE CIRCUIT

(71) Applicant: SHARP KABUSHIKI KAISHA, Sakai, Osaka (JP)

(72) Inventors: Yohsuke Yokoyama, Sakai (JP); Osamu Iuchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/162,907

(22) Filed: Oct. 17, 2018

(65) Prior Publication Data

US 2019/0114985 A1    Apr. 18, 2019

(30) Foreign Application Priority Data

Oct. 18, 2017  (JP) ................................. 2017-201921

(51) Int. Cl.
*G09G 3/36* (2006.01)
*G02F 1/1333* (2006.01)
*G09G 3/20* (2006.01)
*G09G 5/00* (2006.01)

(52) U.S. Cl.
CPC .......... *G09G 3/3677* (2013.01); *G02F 1/1333* (2013.01); *G09G 3/2096* (2013.01); *G09G 3/3685* (2013.01); *G09G 3/3688* (2013.01); *G09G 5/005* (2013.01); *G09G 2310/0297* (2013.01)

(58) Field of Classification Search
CPC .. G09G 3/3677; G09G 3/2096; G09G 3/3685; G09G 3/3688; G09G 5/005; G09G 2310/0297; G02F 1/1333
See application file for complete search history.

(56) References Cited

U.S. PATENT DOCUMENTS

2017/0352332 A1* 12/2017 Nakao ................... G09G 5/005

FOREIGN PATENT DOCUMENTS

JP           2008-299345 A       12/2008

* cited by examiner

*Primary Examiner* — Peter D McLoone
(74) *Attorney, Agent, or Firm* — ScienBiziP, P.C.

(57) ABSTRACT

An image signal preparation circuit receives a serial format original image signal representing an image to be displayed from a host and generates a prepared image signal by changing an order of a plurality of pieces of pixel data constituting each display line of the image depending on a connection relationship between output terminals of a driver IC of a liquid crystal module and source lines (data signal lines) of a display unit. The prepared image signal is input into the driver IC, and the source lines are correctly driven by data signals, respectively, output from the driver IC based on the prepared image signal.

11 Claims, 24 Drawing Sheets

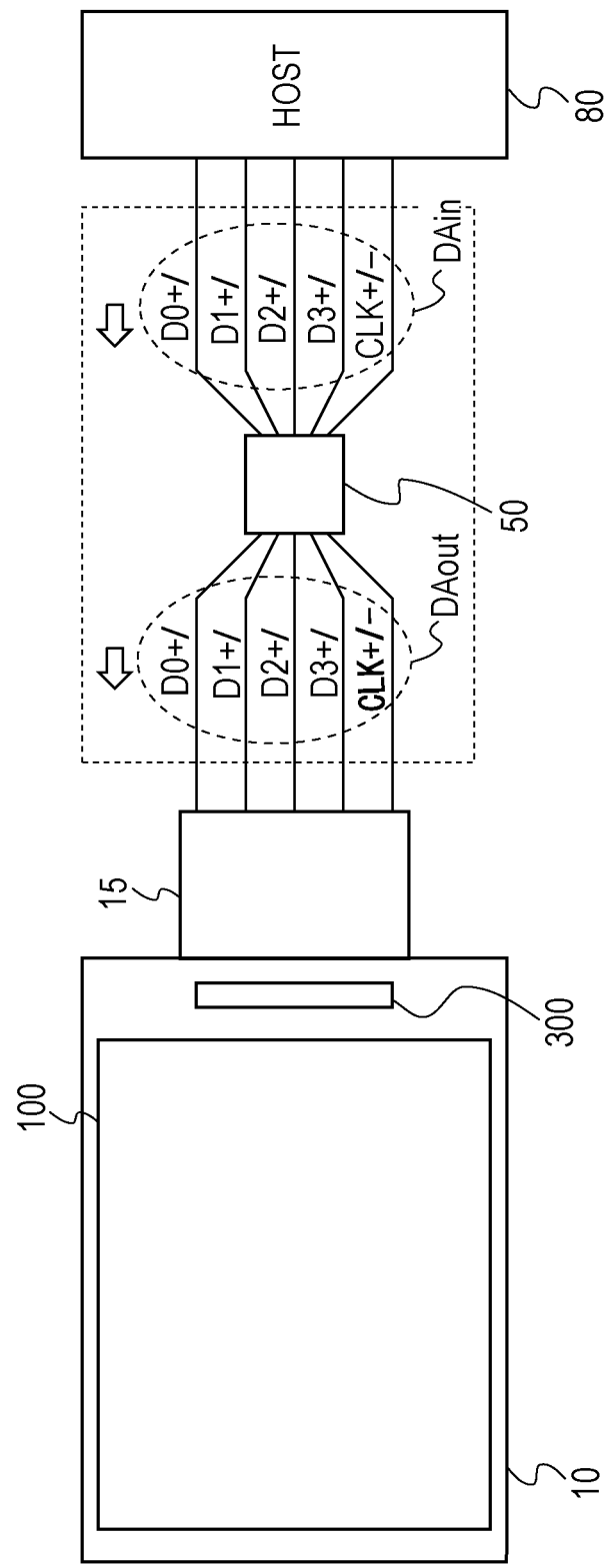

FIG. 10A

| | 1 | 2 | 3 | 4 | 5 | 6 | 7 | 8 | 9 | 10 |
|---|---|---|---|---|---|---|---|---|---|---|
| 1 | (1,1) | (2,1) | (3,1) | (4,1) | (5,1) | (6,1) | (7,1) | (8,1) | (9,1) | (10,1) |
| 2 | (1,2) | (2,2) | (3,2) | (4,2) | (5,2) | (6,2) | (7,2) | (8,2) | (9,2) | (10,2) |
| 3 | | | | | | | | | | |
| 4 | | | | | | | | | | |
| 5 | | | | | | | | | | |
| 6 | | | | | | | | | | |
| 7 | | | | | | | | | | |
| 8 | (1,8) | (2,8) | (3,8) | (4,8) | (5,8) | (6,8) | (7,8) | (8,8) | (9,8) | (10,8) |

FIG. 10B

| | 1 | 3 | 5 | 7 | 9 | 10 | 8 | 6 | 4 | 2 |
|---|---|---|---|---|---|---|---|---|---|---|
| 1 | (1,1) | (3,1) | (5,1) | (7,1) | (9,1) | (10,1) | (8,1) | (6,1) | (4,1) | (2,1) |
| 2 | (1,2) | (3,2) | (5,2) | (7,2) | (9,2) | (10,2) | (8,2) | (6,2) | (4,2) | (2,2) |
| 3 | | | | | | | | | | |
| 4 | | | | | | | | | | |
| 5 | | | | | | | | | | |
| 6 | | | | | | | | | | |
| 7 | | | | | | | | | | |
| 8 | (1,8) | (3,8) | (5,8) | (7,8) | (9,8) | (10,8) | (8,8) | (6,8) | (4,8) | (2,8) |

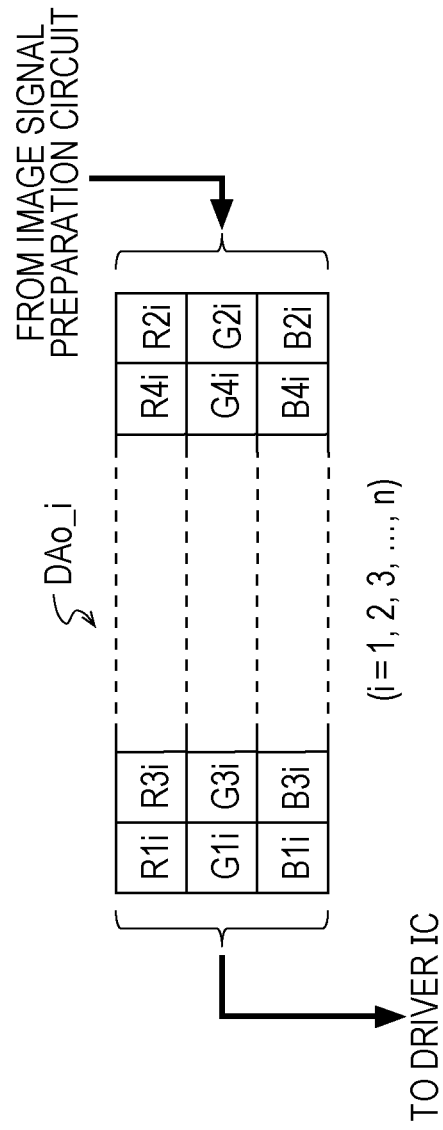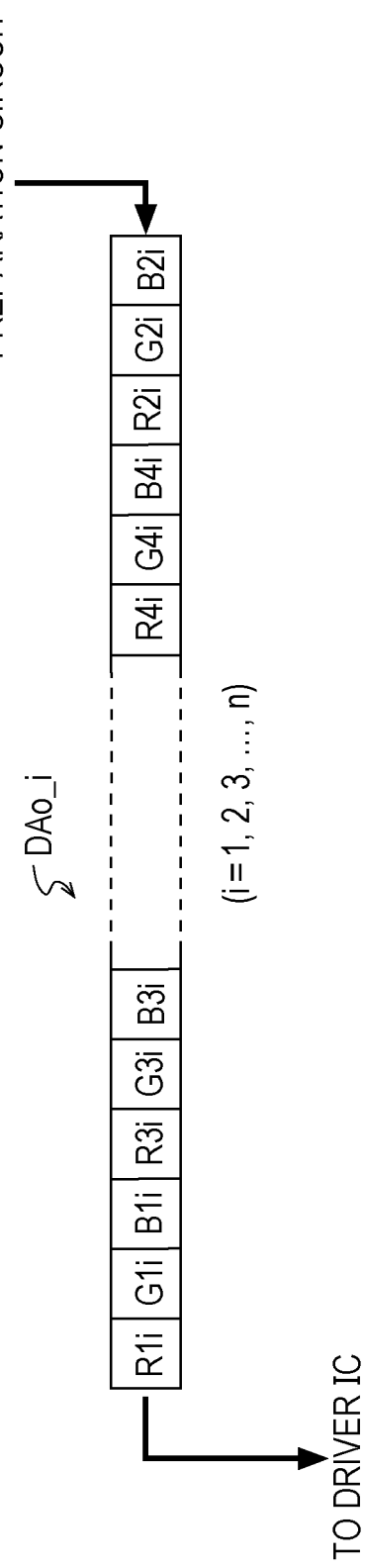

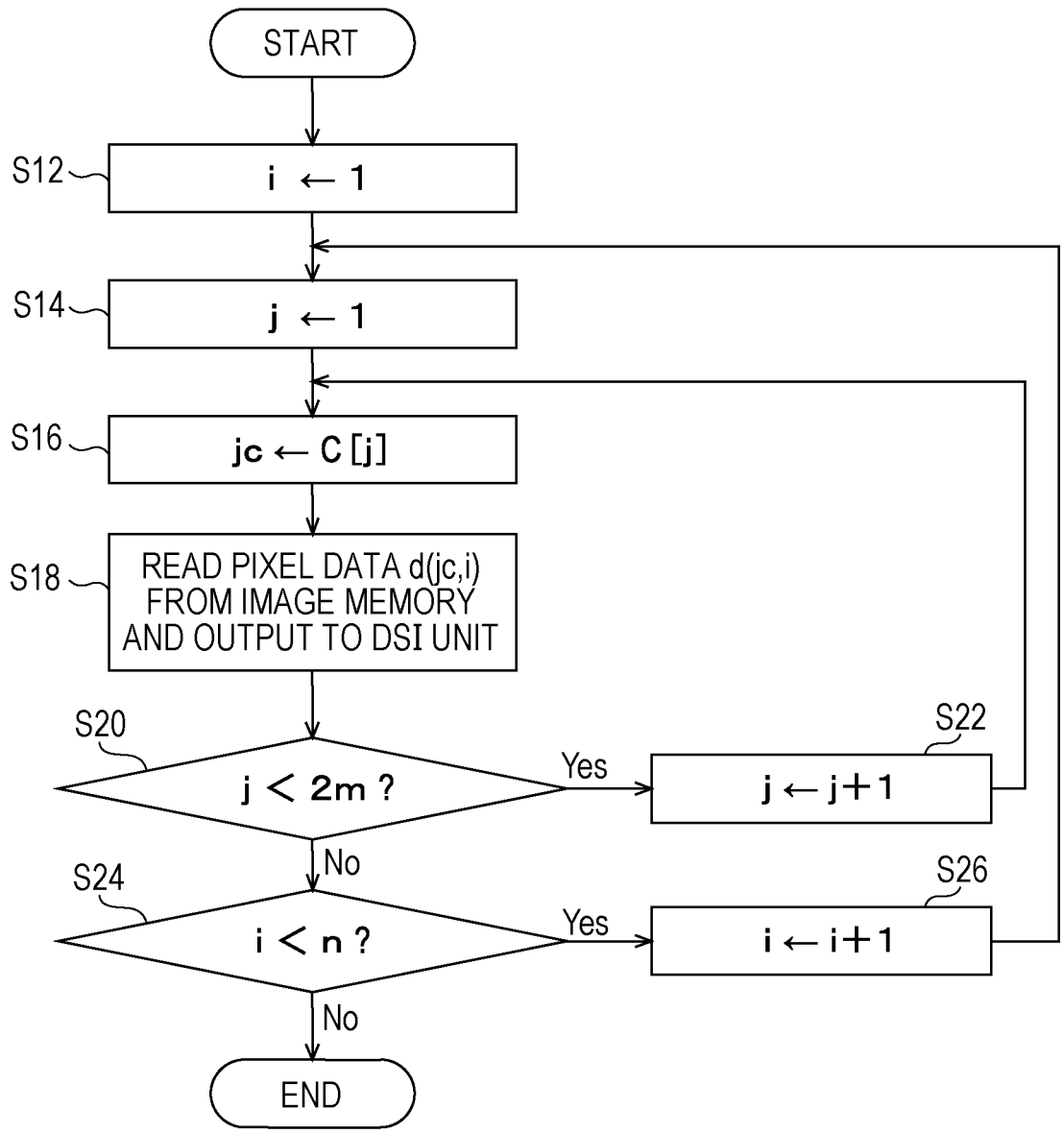

IMAGE SIGNAL PREPARATION CIRCUIT, IMAGE SIGNAL PREPARATION METHOD, AND RECORDING MEDIUM STORING IMAGE SIGNAL PREPARATION PROGRAM FOR DISPLAY DRIVE CIRCUIT

BACKGROUND

1. Field

The present disclosure relates to a circuit, a method, and the like for preparing an image signal to be provided to a drive circuit of a display device (display module) including a horizontally long screen referred to as landscape.

2. Description of the Related Art

A liquid crystal module into which a liquid crystal panel and its drive circuit and the like are combined is used for various purposes. Types of liquid crystal modules include a liquid crystal module called a portrait liquid crystal module that includes a vertically long screen, and a liquid crystal module called a landscape liquid crystal module that includes a horizontally long screen. For example, in a digital camera (DSC), a landscape liquid crystal module is used. This liquid crystal module is mostly designed to have a side terminal configuration such that a plurality of chip on glass (COG) terminals are formed on an end part in the sidewise direction, which is the longitudinal direction, of a substrate constituting a liquid crystal panel. In a landscape liquid crystal module including the side terminal configuration, source lines as data signal lines in the liquid crystal panel are connected to the COG terminals, and output terminals of a driver integrated circuit (IC) including a source driver as a data signal line drive circuit are connected to the COG terminals. An image signal that represents an image to be displayed is provided to the driver IC from the outside as a serial format digital signal. The driver IC outputs a parallel format data signal (image signal for driving) for every one line based on the digital image signal. Data signals are provided to the corresponding source lines in the liquid crystal panel through the COG terminals.

In a portrait liquid crystal module, output terminals of a driver IC 300 are connected to COG terminals formed in an end part in the vertical direction (end part on the short edge side) as illustrated in FIG. 29A. The output terminals in the driver IC 300 and source lines in a liquid crystal panel are connected such that orders of arrangement of both the output terminals and the source lines correspond to each other (refer to FIG. 4 described below). In FIGS. 29A and 29B, reference sign "Gi" (i=1 to n) and narrow solid arrows indicate that scan signals are applied to gate lines (gate lines are driven) as scan signal lines in a liquid crystal panel 100, and a narrow dotted arrow indicates a driving order of the gate lines.

Meanwhile, in a landscape liquid crystal module including a side terminal configuration, as illustrated in FIG. 29B, output terminals of driver IC 300 connected to COG terminals in an end part in the horizontal direction (end part on the short edge side) and source lines in the liquid crystal panel are not connected such that orders of arrangement of both the output terminals and the source lines correspond to each other. For example, as illustrated in FIG. 3, output terminals T1, T2, . . . , T$m$ corresponding to the first half in the arrangement order of the output terminals of the driver IC 300 are respectively connected to odd-numbered source lines SL1, SL3, . . . , SL$2m$−1 in the liquid crystal panel, and output terminals T$m$+1, T$m$+2, . . . , T$2m$ corresponding to the second half in the arrangement order are respectively connected to even-numbered source lines SL$2m$, SL$2m$−2, . . . , SL2 in the liquid crystal panel.

Thus, in order to provide a landscape liquid. crystal module including a side terminal configuration, a dedicated driver IC corresponding to the side terminal configuration or a driver IC corresponding to both of the landscape and portrait liquid crystal modules is used. Consequently, developing the landscape liquid crystal module incurs cost and a period of time. In addition, for example, a latest driver IC that is developed for smartphones may not be used as the driver IC of the landscape liquid crystal module.

It is desirable to provide a device and a method for providing a display device such as a landscape liquid crystal module including a side terminal configuration in a shorter period of time at a lower cost than in the related art.

SUMMARY

According to an aspect of the disclosure, there is provided an image signal preparation circuit that prepares an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the circuit including a memory that stores, in units of display lines, image data representing a display image configured with a plurality of pixels to be formed by the plurality of pixel forming units, an input control circuit that receives the image data representing the display image and writes the image data into the memory, and an output control circuit that reads a plurality of pieces of pixel data representing each display line in the display image from the memory, in which the drive circuit is implemented as an integrated circuit, and a plurality of output terminals of the integrated circuit and the plurality of data signal lines are connected such that an arrangement order of the plurality of output terminals does not correspond to an arrangement order of the plurality of data signal lines, and the output control circuit generates a serial image signal by serially reading the plurality of pieces of pixel data representing each display line from the memory in an order that corresponds to an order of the plurality of data signal lines associated with the arrangement order of the plurality of output terminals by a connection relationship between the plurality of output terminals and the plurality of data signal lines, and supplies the serial image signal to the integrated circuit.

According to another aspect of the disclosure, there is provided an image signal preparation method for preparing an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the method in receiving image data representing a display image configured with a plurality of pixels to be formed by the plurality of pixel forming units, and writing the image data into a memory that stores the image data in units of display lines, and reading a plurality of pieces of pixel data representing each display line in the display image from the memory, in which the drive circuit is implemented as an integrated circuit, and a plurality of output terminals of the integrated circuit and the plurality of data signal lines are connected such that an arrangement order of the plurality of output terminals does not correspond to an arrangement order of the plurality of data signal lines, and in the reading, a serial image signal is generated by serially reading the plurality of pieces of pixel data representing each display line from the memory in an order that corresponds to an order of the plurality of data signal lines associated with the arrangement order of the plurality of output terminals by a connection relationship between the plurality of output terminals and the plurality of data signal lines, and the serial image signal is supplied to the integrated circuit.

According to still another aspect of the disclosure, there is provided an image signal preparation program for preparing an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the program causing a computer to execute reading image data representing a display image configured with a plurality of pixels to be formed by the plurality of pixel forming units from an image memory that stores the image data, and outputting the image data as the image signal to be supplied to the drive circuit, in which the drive circuit is implemented as an integrated circuit, and a plurality of output terminals of the integrated circuit and the plurality of data signal lines are connected such that an arrangement order of the plurality of output terminals does not correspond to an arrangement order of the plurality of data signal lines, and in the reading, the image signal to be supplied to the integrated circuit is generated as a serial image signal by serially reading the plurality of pieces of pixel data representing each display line in the display image from the image memory in an order that corresponds to an order of the plurality of data signal lines associated with the arrangement order of the plurality of output terminals by a connection relationship between the plurality of output terminals and the plurality of data signal lines.

BRIEF DESCRIPTION OF THE DRAWINGS

FIG. 1 is a block diagram illustrating an overall configuration of an apparatus (target apparatus) that uses an image signal preparation circuit according to a first embodiment;

FIG. 10A is a diagram schematically illustrating an original image signal that is the image signal before conversion representing an image to be displayed in the target liquid crystal module of the first embodiment, and FIG. 10B is a schematic diagram for describing the image signal after conversion by the image signal preparation circuit;

FIG. 13A is a diagram illustrating a serial image signal (prepared image signal) in units of pixels output from an image signal preparation circuit according to the second embodiment, and FIG. 13B is a diagram illustrating a serial image signal in units of subpixels;

FIG. 27 is a flowchart illustrating an image signal preparation process based on the image signal preparation program according to the seventh embodiment;

FIG. 28 is a diagram illustrating an index conversion table used in the image signal preparation process in the seventh embodiment.

DESCRIPTION OF THE EMBODIMENTS

Figure 2A:
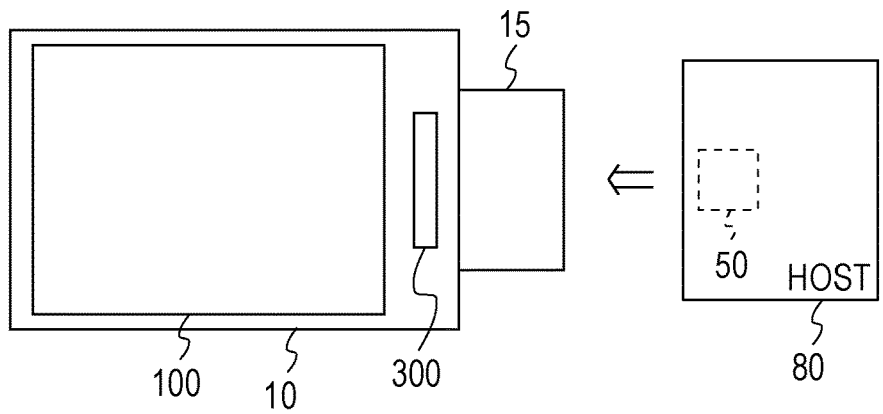
FIGS. 2A to 2C are diagrams illustrating a form of mounting the image signal preparation circuit according to the first embodiment.

Hereinafter, each embodiment will be described with reference to the appended drawings.

1. First Embodiment 1.1 Overall Configuration

FIG. 1 is a block diagram illustrating an overall configuration of an apparatus (hereinafter, referred to as a "target apparatus") that uses an image signal preparation circuit 50 according to a first embodiment. This target apparatus includes a liquid crystal module 10 as a display device and a host 80 that generates a signal (hereinafter, referred to as a "display image signal") representing an image to be displayed in the liquid crystal module 10. The image signal preparation circuit 50 according to the present embodiment is included in the target apparatus as a constituent separated from the liquid crystal module 10 and the host 80. However, instead, the image signal preparation circuit 50 may be included in any of the liquid crystal module 10 or the host 80 (details will be described below).

As illustrated in FIG. 1, the liquid crystal module 10 is a landscape liquid crystal module including a side terminal configuration and includes an active matrix liquid crystal panel 100, a liquid crystal module (LCM) driver 300 as a drive circuit driving the liquid crystal panel 100, and a flexible printed circuit (FPC) 15. The LCM driver 300 is generally implemented as an integrated circuit (IC). Thus, hereinafter, the LCM driver 300 will be referred to as a "driver IC 300". The display image signal generated by the host 80 is input as a serial format image signal (hereinafter, referred to as an "original image signal") DAin into the image signal preparation circuit 50. The image signal preparation circuit 50, by performing a process described below, converts the original image signal DAin into a serial format image signal (hereinafter, referred to as a "prepared image signal") DAout that is suitable for the configuration of the liquid crystal module 10. The prepared image signal DAout is output from the image signal preparation circuit 50 and is provided to the liquid crystal module 10. The prepared image signal DAout is input into the driver IC 300 through the FPC 15.

As an interface for data exchange of the image signal preparation circuit 50 with the host 80 and the liquid crystal module 10, the same interface as in a case where the host 80 is connected to the liquid crystal module 10 without the image signal preparation circuit 50 is used. In the configuration illustrated in FIG. 1, data exchange of the image signal preparation circuit 50 with the host 80 and the liquid crystal module 10 is performed using an interface (specifically, "4-Lane MIPI") that complies with the display serial interface (DSI) standard suggested by. Mobile Industry. Processor Interface (MIPI) Alliance. However, interfaces that can be used here are not limited to such an interface. Instead or in addition, other appropriate interfaces such as interfaces complying with the low voltage differential signaling (LVDS) standard, the embedded display port (e-DP) standard, the inter integrated circuit (I2C) standard, and the serial peripheral interface (SPI) standard may be used.

Figure 2B:
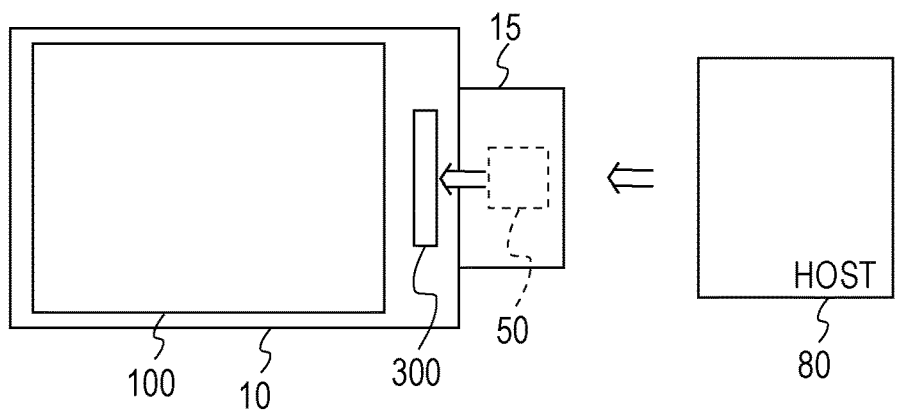
Figure 2C:
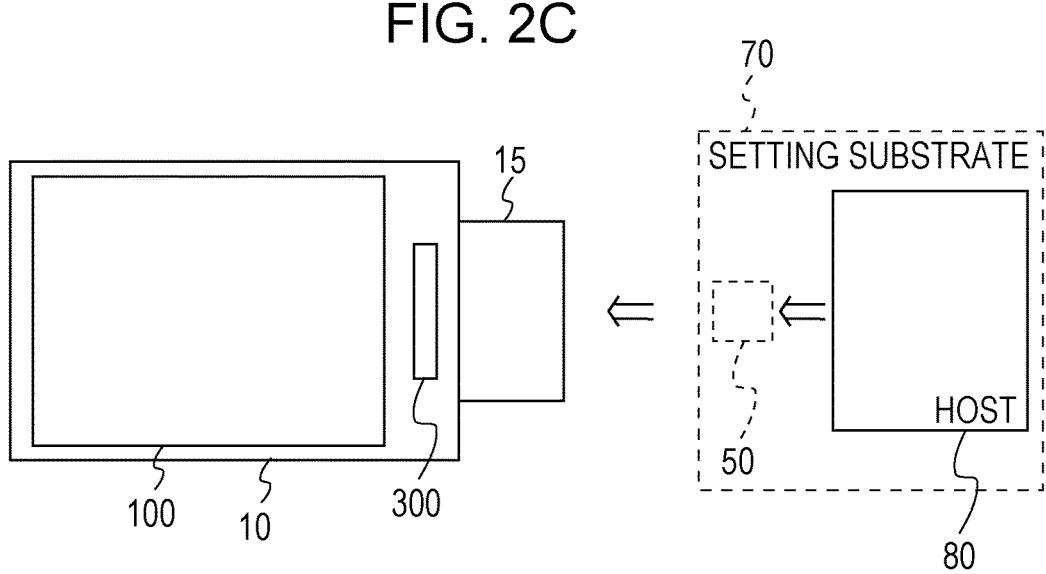

In addition, in the configuration illustrated in FIG. 1, while the image signal preparation circuit 50 is included in the target apparatus as a constituent separated from the liquid crystal module 10 and the host 80, the form of mounting the image signal preparation circuit 50 is not limited thereto and may be any form of mounting illustrated in FIG. 2A to 2C. That is, the image signal preparation circuit 50 may be included in the host 80 as illustrated in FIG. 2A. The image signal preparation circuit 50 may be included in the liquid crystal module 10 (typically, mounted on the FPC 15) as illustrated in FIG. 2B. The image signal preparation circuit 50 may be mounted on a setting substrate 70 on which the host 80 is mounted, as illustrated in FIG. 2C.

1.2 Configuration and Operation of Liquid Crystal Module

Figure 3:
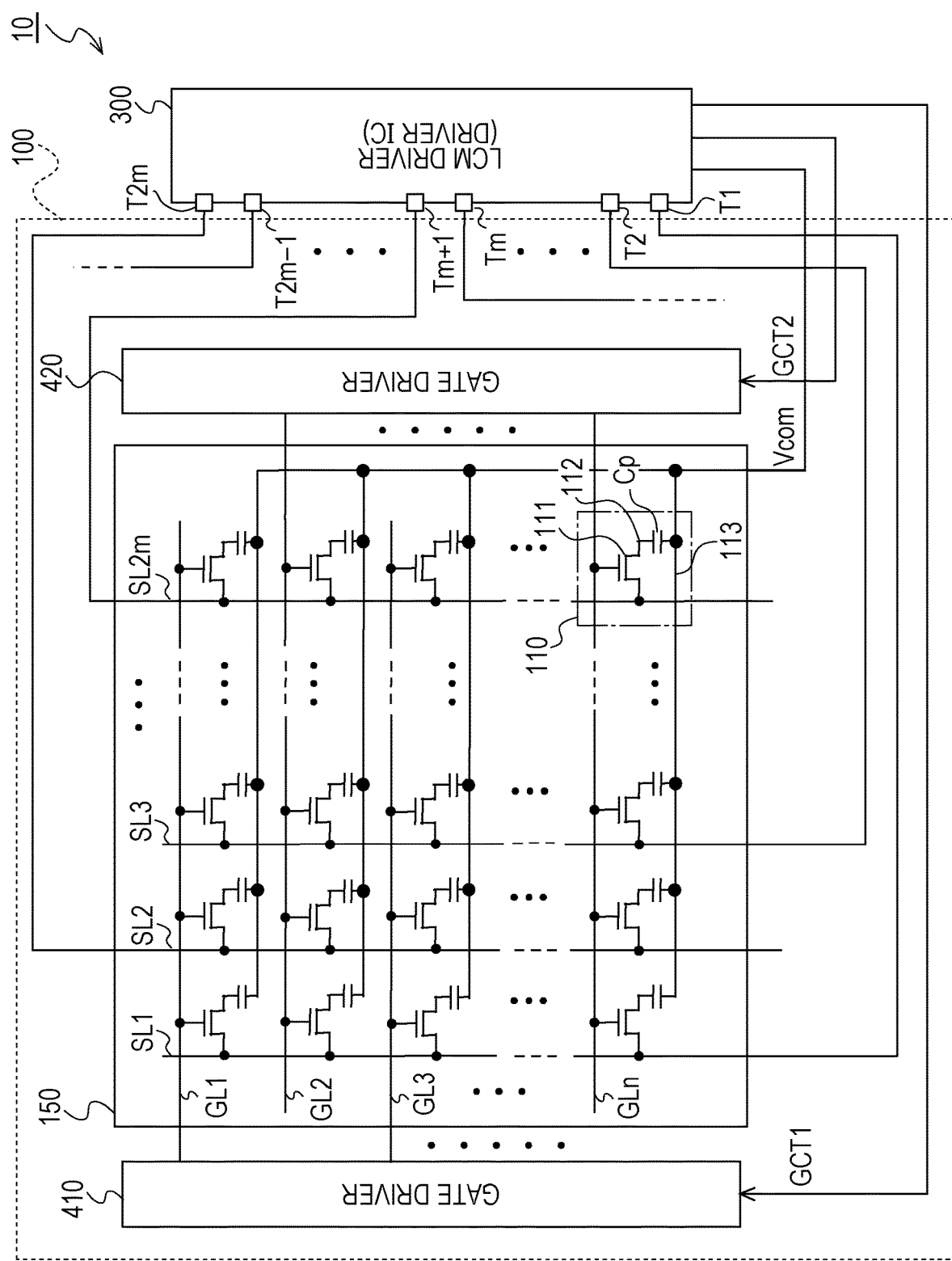
FIG. 3 is a diagram illustrating a configuration of a liquid crystal module (target liquid crystal module) in the target apparatus of the first embodiment.
Figure 4:
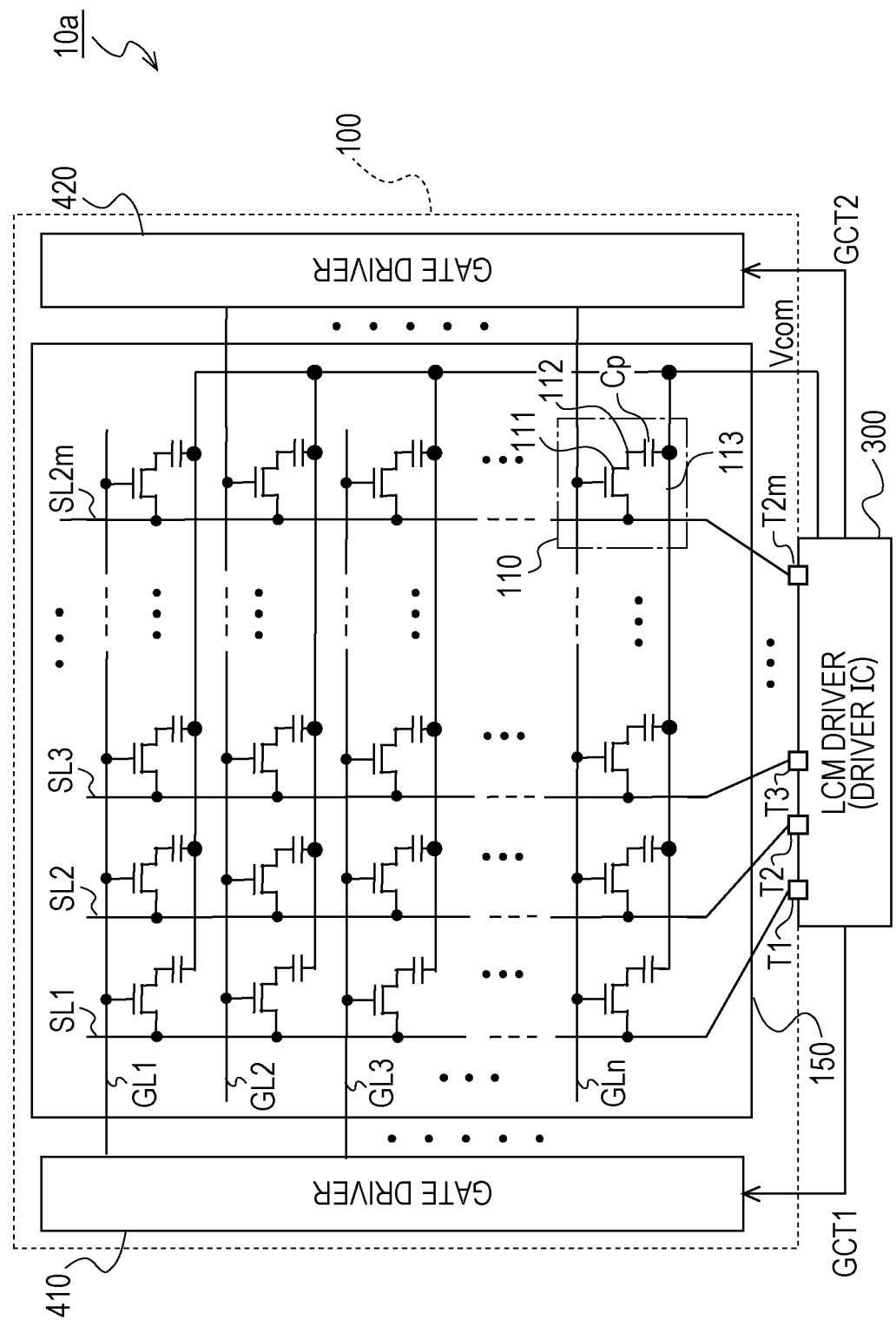
FIG. 4 is a diagram illustrating a configuration of a landscape liquid crystal module in the related art.
Figure 5:
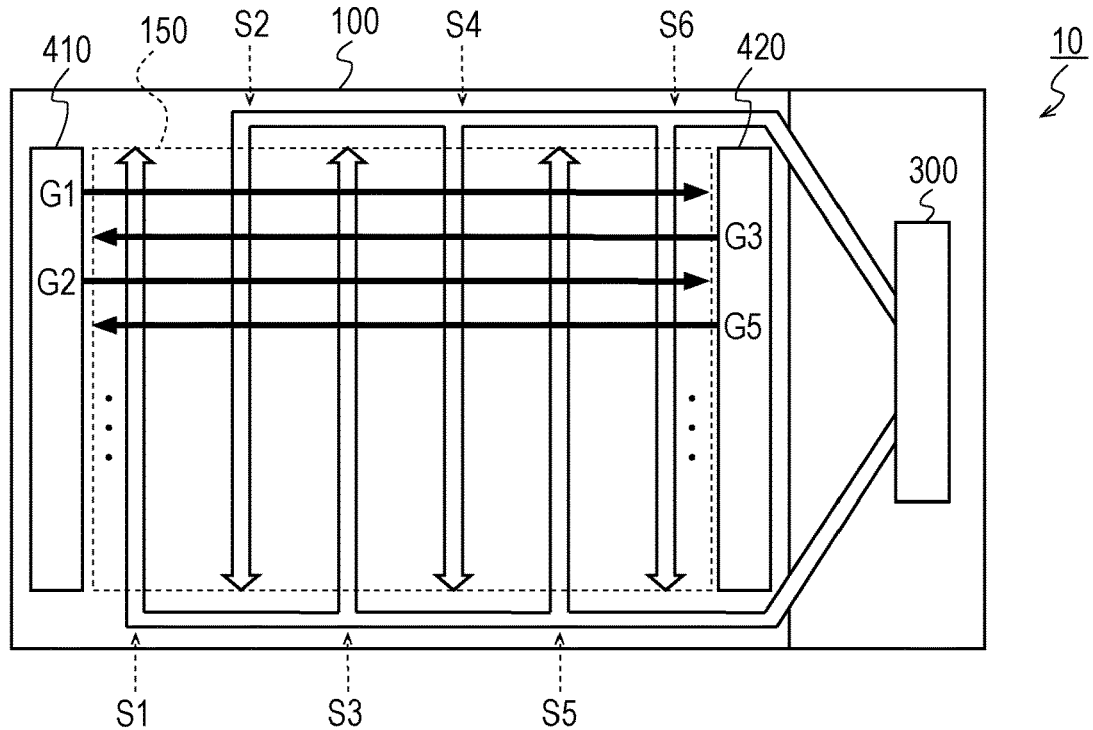
FIG. 5 is a diagram schematically illustrating a flow of drive signal in the target liquid crystal module of the first embodiment.
Figure 6:
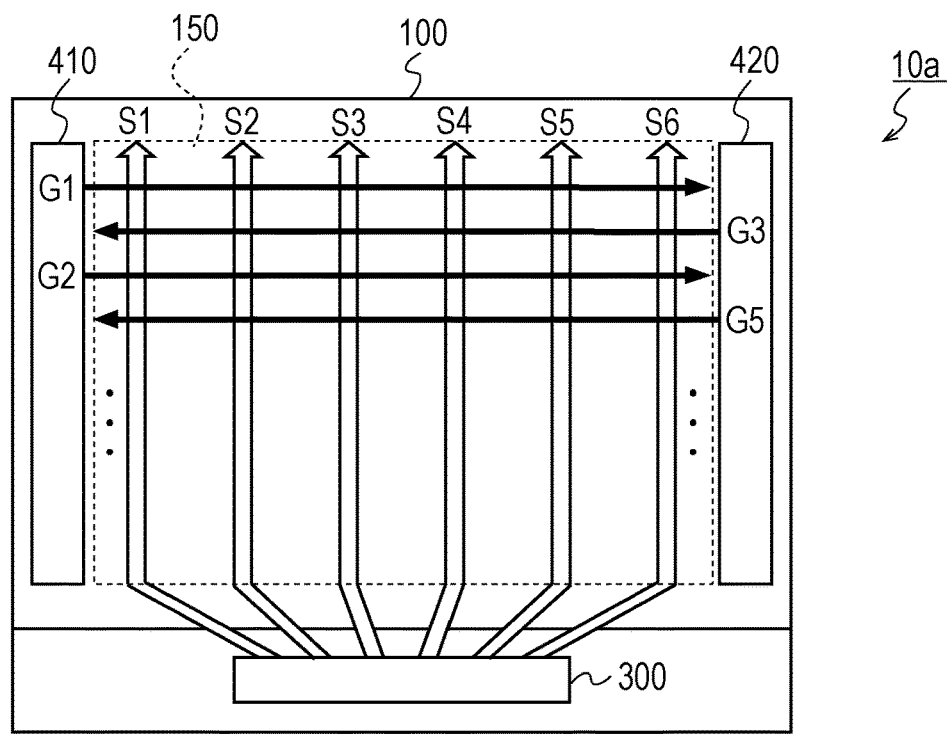
FIG. 6 is a diagram schematically illustrating a flow of drive signal in the liquid crystal module in the related art.

FIG. 3 is a diagram illustrating a configuration of the liquid crystal module (hereinafter, referred to as a "target liquid crystal module") 10 in the target apparatus of the present embodiment. FIG. 4 is a diagram illustrating a configuration of a liquid crystal module 10a in the related art as a comparative example. FIG. 5 is a schematic diagram illustrating a flow of drive signal (data signals S1 to S6 and scan signals G1 to Gn) in the target liquid crystal module 10. FIG. 6 is a schematic diagram illustrating a flow of drive signal (the data signals S1 to S6 and the scan signals G1 to Gn) in the liquid crystal module 10a in the related art. In FIG. 5 and FIG. 6, for convenience of description, it is assumed that the number of source lines in a display unit 150 in the liquid crystal panel 100 is six, and the data signals S1 to S6 are respectively applied to six source lines SL1 to SL6 as drive signals.

As illustrated in FIG. 3, the target liquid crystal module 10 is a landscape liquid crystal module including a side terminal configuration and includes the liquid crystal panel 100 and the LCM driver (driver IC) 300 as the drive circuit of the liquid crystal panel 100. The liquid crystal panel 100 is a so-called gate driver monolithic (GDM) liquid crystal panel and includes first and second gate drivers 410 and 420 as scan signal line drive circuits in addition to the display unit 150.

Source lines SL1 to SL2$m$ as a plurality of (2m) data signal lines, gate lines GL1 to GLn as a plurality of (n) scan signal lines, and a plurality of (2m×n) pixel forming units 110 that are disposed in correspondence with intersections between the 2m source lines SL1 to SL2$m$ and the n gate lines GL1 to GLn are formed in the display unit 150. Hereinafter, in a case where the 2m source lines SL1 to SL2$m$ are not distinguished from each other, the 2m source lines SL1 to SL2$m$ will be simply referred to as "source lines SL". In a case where the n gate lines GL1 to GLn are not distinguished from each other, the n gate lines GL1 to GLn will be simply referred to as "gate lines GL". The 2m×n pixel forming units 110 are formed in a matrix form along the source lines SL and the gate lines GL. Each pixel forming unit 110 is configured with a thin film transistor (hereinafter, abbreviated to "TFT") 111 as a switching element configured by connecting its gate terminal as a control terminal to the gate line GL passing through its corresponding intersection and connecting its source terminal to the source line SL passing through the intersection, a pixel electrode 112 connected to the drain terminal of the TFT 111, a common electrode 113 disposed in common in the 2m×n pixel forming units 110, and a liquid crystal layer that is sandwiched between the pixel electrode 112 and the common electrode 113 and is disposed in common in the plurality of pixel forming units 110. A pixel capacitance Cp is configured with a liquid crystal capacity that is formed by the pixel electrode 112 and the common electrode 113. Typically, an auxiliary capacity is disposed in parallel with the liquid crystal capacity in order to securely maintain a voltage in the pixel capacitance Cp. Thus, in actuality, the pixel capacitance Cp is configured with the liquid crystal capacity and the auxiliary capacity.

The driver IC (LCM driver) 300 includes 2m. output terminals T1 to T2m for driving the source lines SL1 to SL2m in the display unit 150. The driver IC 300 generates data signals S1 to S2m to be respectively applied to the source lines SL1 to SL2m based on the prepared image signal DAout input from the image signal preparation circuit 50. In a case where 2m pieces of pixel data d1 to d2m constituting image data of one display line are assumed to be input into the driver IC 300 as a serial format image signal, 2m data signals respectively corresponding to the 2m pieces of pixel data d1 to d2m are output from the output terminals T1 to T2m of the driver IC 300.

Here, a case where the 2m pieces of pixel data d1 to d2m are input as a serial format image signal into the liquid crystal module 10a in the related art illustrated in FIG. 4 is considered. The liquid crystal module 10a in the related art is such that COG terminals are formed on an end part in the transverse direction (the extending direction of the source line SLj) of a substrate constituting the liquid crystal panel 100. Thus, the output terminals T1 to T2m of the driver IC 300 are respectively connected to the source lines SL1 to SL2m. Thus, even in a case where the serial format original image signal DAin output from the host 80 is input into the driver IC 300, the data signals S1 to S2m are correctly applied to the source lines SL1 to SL2m respectively as illustrated in FIG. 6.

However, in the target liquid crystal module 10, as illustrated in FIG. 3, since the side terminal configuration is used, the output terminals T1 to T2m and the source lines SL1 to SL2m are not connected such that the arrangement order of the output terminals T1 to T2m of the driver IC 300 for driving the source lines SL1 to SL2m of the display unit 150 corresponds to the arrangement order of the source lines SL1 to SL2m. That is, among the source lines SL1 to SL2m in the display unit 150, the odd-numbered source lines SL1, SL3, . . . , SL2m−1 are respectively connected to the first to m-th output terminals (hereinafter, referred to as the "first half output terminals") T1 to Tm in the driver IC 300, and the even-numbered source lines SL2, SL4, . . . , SL2m are respectively connected to the 2m-th to (m+1)-th output terminals (hereinafter, referred to as the "second half output terminals") T2m to Tm+1 in the driver IC 300. Thus, in a case where the serial format image signal including the pixel data is input into the driver IC 300 in a temporal order corresponding to the arrangement order of the source lines SL1 to SL2m, that is, in a case where the serial format original image signal DAin output from the host 80 input into the driver IC 300, the data signals S1 to S2m may not be correctly applied to the source lines SL1 to SL2m. In order to reduce such a situation, in the present embodiment, the prepared image signal DAout is generated in the image signal preparation circuit 50 by changing the temporal order of pixel data included in the image signal (original image signal) DAin output from the host 80 depending on the above connection relationship (details will be described below).

In addition, the driver IC 300 generates first and second scan side control signals GCT1 and GCT2 to be provided to the first and second gate drivers 410 and 420 respectively.

The first gate driver 410 generates scan signals G1, G3, . . . based on the first scan side control signal GCT1 and applies the scan signals G1, G3, . . . to the odd-numbered gate lines GL1, GL3, . . . respectively. The second gate driver 420 generates scan signals G2, G4, . . . based on the second scan side control signal GCT2 and applies the scan signals G2, G4, . . . to the even-numbered gate lines GL2, GL4, . . . respectively. Accordingly, the gate lines GL1 to GLn in the display unit 150 are sequentially selected in every one horizontal interval, and a high level voltage that sets the TFT 111 of each pixel forming unit 110 to be in an ON state is applied to the selected gate line GLi for one horizontal interval.

A backlight unit, not illustrated, is disposed on the rear surface side of the liquid crystal panel 100. The rear surface or the liquid crystal panel 100 is irradiated with backlight from the backlight unit. In a case where the liquid crystal panel 100 is a reflective liquid crystal panel, the backlight unit is not disposed.

As described thus far, by applying the data signals S1 to S2m to the source lines SL1 to SL2m, applying the scan signals G1 to Gn to the gate lines GL1 to GLn, and driving the backlight unit, an image corresponding to the original image data DAin output from the host 80 is displayed on the display unit 150 of the liquid crystal panel 100. As described above, while a voltage is to be applied to the common electrode 113 (the common electrode 113 is to be driven) in order to display the image in the liquid crystal panel 100, such configurations and operations are not directly related to the features of the present disclosure and thus, will not be described.

1.3 Configuration and Operation of Image Signal Preparation Circuit

Figure 7:
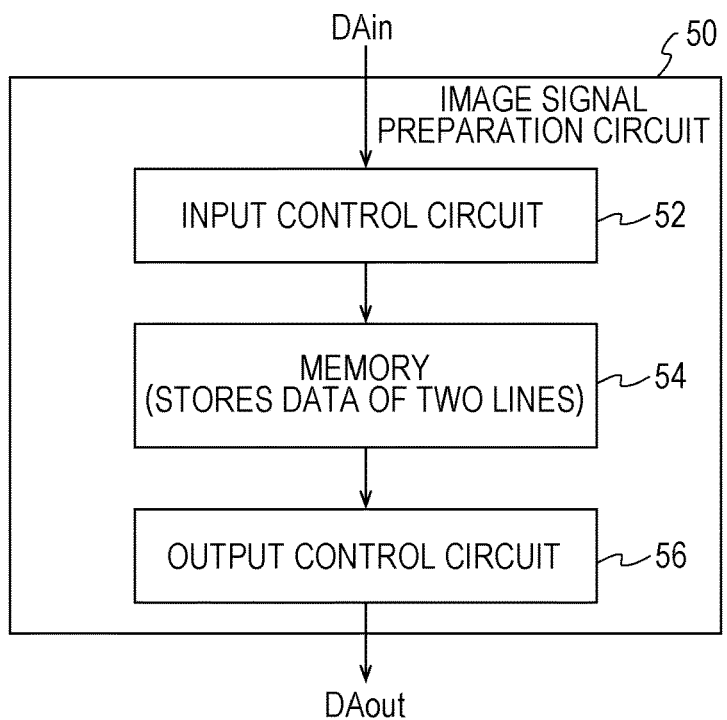
FIG. 7 is a block diagram illustrating a configuration of the image signal preparation circuit according to the first embodiment.

FIG. 7 is a block diagram illustrating a configuration of the image signal preparation circuit 50 according to the present embodiment. The image signal preparation circuit 50 includes an input control circuit 52, a memory 54, and an output control circuit 56. The memory 54 can store image data of two display lines. The display image signal in a serial format is input into the input control circuit 52 as the original image signal DAin from the host 80. The serial format image signal to be provided to the driver IC 300 of the target liquid crystal module 10 is output as the prepared image signal DAout from the output control circuit 56.

The memory 54 includes first and second line memories. Each of the first and second line memories has a capacity that can store image data of one display line. The input control circuit 52 switches a write location of input image data between the first line memory and the second line memory for every one horizontal interval in the display operation of the liquid crystal module 10, and writes image data indicated by the original image signal DAin received from the host 80 into the first and second line memories alternately one display line at a time.

While the original image signal DAin from the host. 80 is written as image data into one line memory of the first and second line memories in the memory 54, the output control circuit 56 reads the image data in an order, described below, from the other line memory and outputs the read image data as the serial format prepared image signal DAout. Accordingly, the original image signal DAin is converted into the prepared image signal DAout by changing the order of 2m pieces of pixel data of each display line included in the original image signal DAin. Hereinafter, this conversion process will be described in detail. In the following description, for convenience of description, assumptions are made as follows. The number of source lines SL1 to SL2m in the display unit 150 of the target liquid crystal module 10 is 10 (m=5). The number of gate lines GL1 to GLn in the display unit 150 is eight (n=8). Image data of one display line is configured with 10 pieces of pixel data image data is input and output with respect to the image signal preparation circuit 50 as a serial image signal in units of pixels.

Figure 8A:
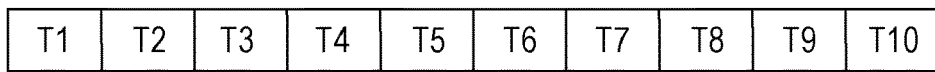
FIGS. 8A and 8B are diagrams schematically illustrating a connection relationship between source lines of a display unit and output terminals of a driver IC that receives an image signal from the image signal preparation circuit according to the first embodiment.
Figure 8B:
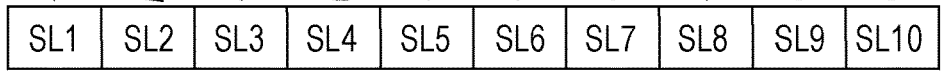

FIGS. 8A and 8B are diagrams schematically illustrating a connection relationship between the output terminals T1 to T10 of the driver IC 300 and the source lines SL1 to SL10 of the display unit 150 in the target liquid crystal module 10. As described above, in the target liquid crystal module 10, the first half output terminals T1 to T5 in the driver IC 300 are respectively connected to the odd-numbered source lines SL1, SL3, . . . , SL9, and the second half output terminals T6 to T10 are respectively connected to the even-numbered source lines SL10, SL8, . . . , SL2 (refer to FIG. 3). Thus, in order to correctly apply the data signals S1 to S10 to the source lines SL1 to SL10 in the display unit 150, the prepared image signal DAout is to be generated such that the data signals S1, S3, S5, S7, S9, S10, S8, S6, S4, and S2 are respectively output from the output terminals T1, T2, T3, T4, T5, T6, T7, T8, T9, and T10 of the driver IC 300. More generally, the prepared image signal DAout is to be generated such that the data signal S2$k$−1 is output from the first half output terminal Tk (k=1 to m), and the data signal S2($m$−$k$+1) is output from the second half output terminal Tm+k.

Figure 9A:
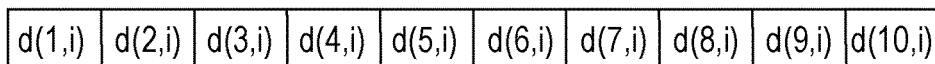
FIGS. 9A and 9B are diagrams schematically illustrating conversion of the image signal by the image signal preparation circuit according to the first embodiment.
Figure 9B:
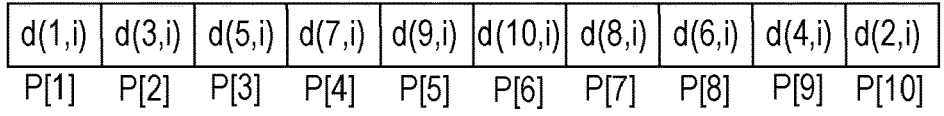

In a case where pieces of pixel data indicated by the data signals S1 to S10 to be respectively applied to the source lines SL1 to SL10 when the i-th gate line GLi is selected are denoted by d(1,i) to d(10,i), 10 pieces of pixel data d(1,i) to d(10,i) as image data of the i-th row display line are output in order in units of pixels from the host 80 as the original image signal DAin. In a case where the original image signal DAin including the 10 pieces of pixel data d(1,i) to d(10,i) is input into the driver IC 300 in the target liquid crystal module 10, the data signals S1 to S10 respectively corresponding to the pieces of pixel data d(1,i) to d(10,i) are respectively output from the output terminals T1 to T10. Thus, in order to correctly apply the data signals S1 to S10 to the source lines SL1 to SL10, the image signal preparation circuit 50 generates the prepared image signal DAout by changing the order of the pieces of pixel data d(1,i) to d(10,i) included in the original image signal DAin as illustrated in FIGS. 9A and 9B depending on the connection relationship illustrated in FIGS. 8A and 8B. That is, the prepared image signal DAout is generated such that among the pieces of pixel data d(1,i) to d(2m,i) of the i-th row display line, the odd-numbered pixel data d(2k−1,i) is output in k-th place, and the even-numbered pixel data d(2k,i) is output in (2m−k+1)-th place (k=1 to m). More generally, the prepared image signal DAout is generated such that the pieces of pixel data d(1,i) to d(2m,i) constituting the image data of the i-th row display line are output in an order of (d(1,i)→d(3,i)→ . . . →d(4,i)→d(2,i)) corresponding to the order of the source lines SL1 to SL2$m$ (SL1→SL3→ . . . →SL4→SL2) that is associated with the arrangement order of the output terminals T1 to T2$m$ by the connection relationship between the output terminals T1 to T2$m$ of the driver IC 300 and the source lines SL1 to SL2$m$ (refer to FIG. 11B described below).

Specifically, in a certain horizontal interval, the input control circuit 52 sequentially writes the pieces of pixel data d(1,i) to d(10,i) of the i-th row display line indicated by the original image signal DAin into one line memory of the first and second line memories as illustrated in FIG. 9A. In the subsequent horizontal interval, the output control circuit 56 reads the pieces of pixel data d(1,i) to d(10,i) of the i-th row display line from the one line memory in the order illustrated in FIG. 9B and outputs the read data as the serial format prepared image signal DAout. In the certain horizontal interval, the output control circuit 56 reads the pieces of pixel data d(1,i−1) to d(10,i−1) of the (i−1)-th row display line from the other line memory of the first and second line memories in an order corresponding to the order illustrated in FIG. 9B. In addition, in the subsequent horizontal interval, the input control circuit 52 writes the pieces of pixel data d(1,i+1) to d(10,i+1) of the (i+1)-th row display line indicated by the original image signal DAin into the other line memory in an order corresponding to the order illustrated in FIG. 9A.

In the image signal preparation circuit 50 having the above configuration, the conversion process of converting the original image signal DAin into the prepared image signal DAout, that is, a process of changing the output order of 2m pieces of pixel data of each display line depending on the connection relationship between the output terminals T1 to T2$m$ of the driver IC 300 and the source lines SL1 to SL2$m$, is implemented by controlling the reading of the image data (2m pieces of pixel data) of each display line from the memory 54. Instead, the image signal preparation circuit 50 may be configured such that the conversion process is implemented by controlling the writing of the image data of each display line indicated by the original image signal DAin into the memory 54.

In this case, in a case where the pieces of pixel data d(1,i) to d(10,i) of the i-th row display line indicated by the original image signal DAin are serially input in the order illustrated in FIG. 9A, the input control circuit 52, as will described below, writes the pieces of pixel data d(1,i) to d(10,i) into one line memory of the first and second line memories constituting the memory 54 into which the pieces of pixel data d(1,i) to d(10,i) are to be written. That is, in a case where the one line memory is configured with 10 memory elements P[1] to P[10], each of which can store one piece of pixel data, the input control circuit 52 writes the pieces of pixel data d(1,i) to d(10,i) into the one line memory in a certain horizontal interval as illustrated in FIG. 9B. In the subsequent horizontal interval, the output control circuit 56 reads the pixel data in order from the head of the memory elements P[1] to P[10] in the one line memory and outputs the read data as the serial format prepared image signal DAout. More generally, in a certain horizontal interval, the input control circuit 52 writes the pixel data d(2k−1,i) into the memory element P[k] and writes the pixel data d(2k,i) into the memory element P[2$m$-$k$+1] (k=1 to m). In the subsequent horizontal interval, the output control circuit 56 reads the pixel data in order from the head of the memory elements P[1] to P[2$m$] in the one line memory and outputs the read data as the serial format prepared image signal DAout.

In this case, in the certain horizontal interval, the output control circuit 56 reads the pieces of pixel data d(1,i−1) to d(10,i−1) of the (i−1)-th row display line in order from the head of memory elements Q[1] to Q[10] that constitute the other line memory of the first and second line memories, and outputs the read data as the serial format prepared image signal DAout. In addition, in the subsequent horizontal interval, the input control circuit 52 writes the pieces of pixel data d(1,i+1) to d(10,i+1) of the (i+1)-th row display line into the other line memory in an order corresponding to the order illustrated in FIG. 9B.

1.4 Action and Effect

According to the present embodiment, the original image signal DAin output from the host 80 as the display image signal is converted into the prepared image signal DAout by the image signal preparation circuit 50, and the prepared image signal DAout is input into the driver IC 300 of the liquid crystal module 10. The prepared image signal DAout is acquired by changing the order of 2m pieces of pixel data of each display line indicated by the original image signal DAin depending on the connection relationship between the output terminals T1 to T2m of the driver IC 300 and the source lines SL1 to SL2m in the side terminal configuration liquid crystal module 10 (FIG. 3) (refer to FIGS. 8A and 8B and FIGS. 9A and 9B). Thus, a typical drive circuit, for example, a driver IC that is designed for liquid crystal modules in smartphones, can be used as the driver IC 300 in a side terminal configuration liquid crystal module such as the target liquid crystal module 10. That is, a drive circuit that is dedicated depending on the connection relationship is not used as the driver IC 300. Such actions and effects of the present embodiment will be specifically described with reference to FIGS. 10A and 10B and FIGS. 11A and 11B. In the following description, it is assumed that the number of source lines in the display unit 150 in the liquid crystal panel 100 is 10, and the number of gate lines is eight. In addition, in FIGS. 10A and 10B and FIGS. 11A and 11B, the pixel data d(j,i) that is to be written by providing the data signal Sj to the pixel forming unit 110 (hereinafter, reference sign "P(j,i)" will be used instead of reference sign "110" in a case where a distinction from other pixel forming units is made) corresponding to the i-th gate line GLi and the j-th source line SLj is abbreviated to "(j,i)".

Figure 11A:
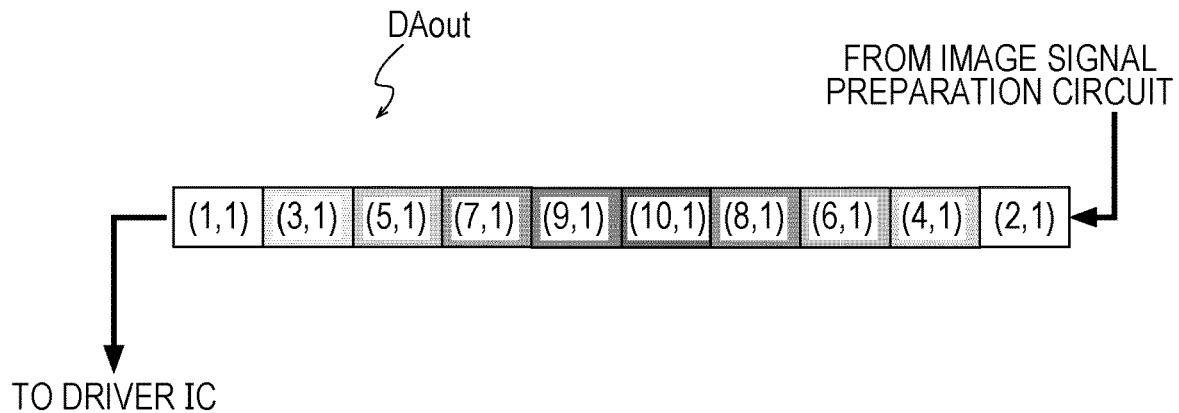
FIG. 11A is a diagram illustrating a prepared image signal output from the image signal preparation circuit according to the first embodiment.
Figure 11B:
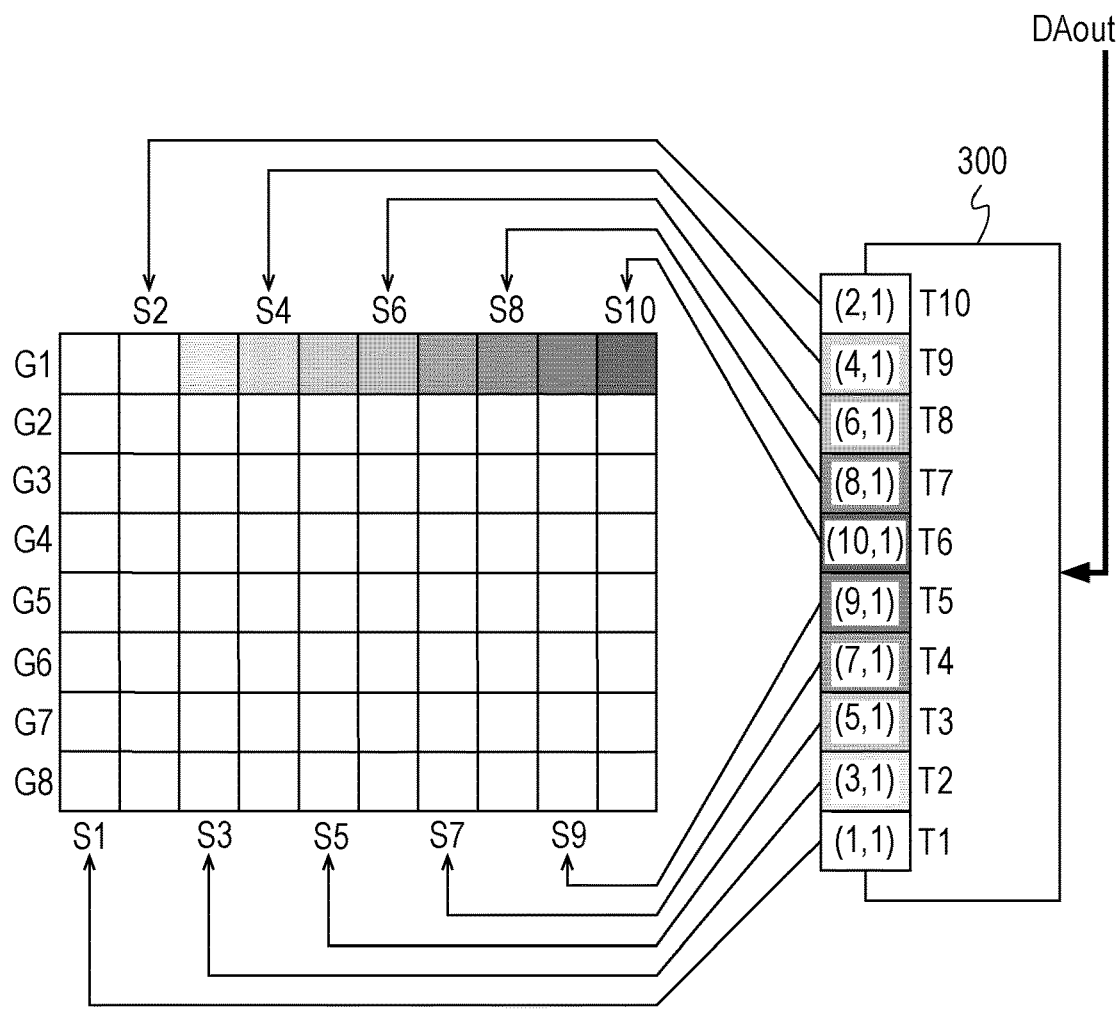
FIG. 11B is a diagram for describing actions and effects of the first embodiment.

For example, the original image signal DAin representing the image illustrated in FIG. 10A is converted into the prepared image signal DAout representing the image illustrated in FIG. 10B by the image signal preparation circuit 50, and the prepared image signal DAout is input into the driver IC 300 as a serial signal in units of pixels. In this case, for example, 10 pieces of pixel data illustrated in FIG. 11A are input as image data of the first display line into the driver IC 300 as the prepared image signal DAout in one horizontal interval. In the horizontal interval subsequent to the one horizontal interval, as illustrated in FIG. 11B, 10 data signals corresponding to the pixel data are output from the output terminals T1 to T2m of the driver IC 300 and are applied to the source lines SL1 to SL10 depending on the above connection relationship. As is understood from FIGS. 11A and 11B, the data signals S1 to S10 are correctly applied to the source lines SL1 to SL10 based on the prepared image signal DAout output from the image signal preparation circuit 50. At this point, the scan signal G1 is active, and the gate line GL1 is selected. Thus, the pieces of pixel data d(1,1), d(2,1), . . . , d(10,1) indicated by the data signals S1 to S10 are respectively. written into the pixel forming units P(1,1), P(2,1), . . . , P(10,1).

According to the present embodiment thus far, the original image signal DAin from the host 80 is converted into the prepared image signal DAout by the image signal preparation circuit 50 based on the connection relationship between the output terminals T1 to T2m of the driver IC 300 and the source lines SL1 to SL2m, and the prepared image signal DAout is input into the driver IC 300. Thus, even in a side terminal configuration liquid crystal module, the source lines SL1 to SL2m. are correctly driven by a typical driver IC without using a dedicated driver IC. For example, a general-purpose driver that is used in a liquid crystal module in a smartphone or the like can be used as the driver IC in the side terminal configuration liquid crystal module.

Therefore, a side terminal configuration liquid crystal module such as a landscape liquid crystal module can be provided in a shorter period of time at a lower cost than in the related art. That is, in a case where a dedicated custom driver IC is used in the side terminal configuration liquid crystal module, the period of time for development (a period of time from a review of specifications to manufacturing through circuit design and layout) is approximately 8 to 10 months (longer than or equal to 10 months depending on the specifications). However, the period of time for development can be reduced to almost half even in a case where the image signal preparation circuit 50 is developed as a simple application specific integrated circuit (ASIC). In addition, in a case where the image signal preparation circuit 50 is developed as a simple ASIC, its cost, of development is approximately a fraction of the cost of development of the custom driver IC.

In the present embodiment, the number of output terminals of the driver IC 300 and the number of source lines are even numbers (2m). However, as is understood from the above description, an image signal preparation circuit having the same configuration can be implemented even in a case where those numbers are odd numbers. The same applies to other embodiments described below.

2. Second Embodiment

Next, the image signal preparation circuit 50 according to a second embodiment and the liquid crystal display module (target liquid crystal module) 10 that receives the prepared image signal DAout output from the image signal preparation circuit 50 will be described. The conversion process in the image signal preparation circuit 50 according to the present embodiment and the connection relationship between the output terminals of the driver IC and the source lines of the display unit in the target liquid crystal module 10 are different from those in the first embodiment. However, other configurations in the apparatus (target apparatus) using the image signal preparation circuit 50 are the same. Thus, the same or corresponding parts will be designated by the same reference signs and will not be described in detail. The same applies to third to sixth embodiments described below.

Figure 12:
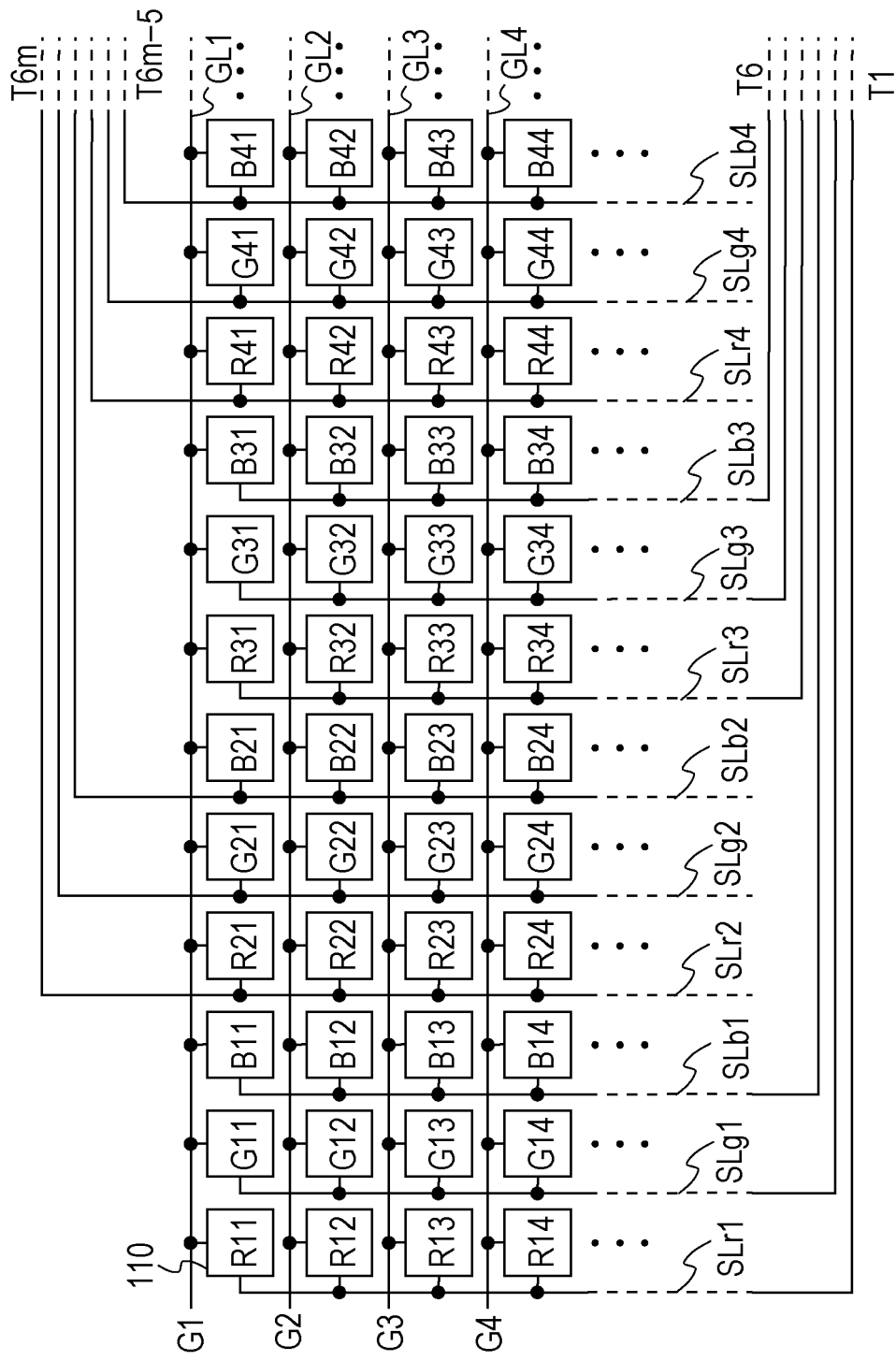
FIG. 12 is a diagram for describing a connection relationship between source lines of a display unit and output terminals of a driver IC in a target 1 crystal module of a second embodiment.

FIG. 12 is a diagram for describing a connection relationship between output terminals T1 to T6m of the driver IC 300 and source lines SLr1 to SLr2m, SLg1 to SLg2m, and SLb1 to SLb2m of the display unit 150 in the target liquid crystal module 10. The target liquid crystal module 10 displays a color image using three primary colors configured with red (R), green (G), and blue (B). Accordingly, an R subpixel forming unit, a G subpixel forming unit, and a B subpixel forming unit for respectively forming an R subpixel, a G subpixel, and a B subpixel are arranged adjacent to each other in the extending direction of the gate lines in the display unit 150. That is, in the target liquid crystal module 10 of the present embodiment, a pixel forming unit for forming each pixel of the image to be displayed is configured with the R subpixel forming unit, the G subpixel forming unit, and the B subpixel forming unit. Pixel data that represents each pixel is configured with R subpixel data, C subpixel data, and B subpixel data that are to be respectively written into the R subpixel forming unit, the G subpixel forming unit, and the B subpixel forming unit. Each subpixel forming unit has the same configuration as each pixel forming unit 110 in the target liquid crystal module of the first embodiment (refer to FIG. 3). Each subpixel forming unit corresponds to any one of the 6m source lines SLr1 to SLr2m, SLg1 to SLg2m, and SLb1 to SLb2m in the display unit 150 and corresponds to any one of the n gate lines GL1 to GLn. Each pixel forming unit will be designated by the same reference sign "110" in a case where the pixel forming units are not distinguished from each other.

In the display unit 150, 2m sets of source line groups, each set of which includes three source lines configured with an R source line SLrj connected to the R subpixel forming unit, a G source line SLgj connected to the G subpixel forming unit, and a B source line SLbj connected to the B subpixel forming unit, are arranged (j=1 to 2m). Accordingly, the driver IC 300 includes 6m output terminals T1 to T6m. In FIG. 12, rectangles denote the subpixel forming units 110, and "Xji" (X=R, G, B) attached to each subpixel forming unit 110 denotes the pixel data to be written into the subpixel forming unit 110. That is, the R subpixel data to be written into the R subpixel forming unit (hereinafter, referred to as an "R subpixel forming unit in the i-th row and the j-th set") 110 connected to the i-th gate line GL1 and the R source line SLrj in the j-th set is denoted by "Rji". The G subpixel data to be written into the G subpixel forming unit (hereinafter, referred to as a "G subpixel forming unit in the i-th row and the j-th set") 110 connected to the i-th gate line GL1 and the G source line SLg1 in the j-th set is denoted by "Gji". The B subpixel data to be written into the B subpixel forming unit (hereinafter, referred to as a "B subpixel forming unit in the i-th row and the j-th set") 110 connected to the i-th gate line GL1 and the B source line SLbj in the j-th set is denoted by "Bji".

Such configurations and the names and reference signs of the constituents in the display unit 150 are the same in other embodiments described below.

As illustrated in FIG. 12, in the target liquid crystal module 10, in the same manner as the first embodiment, the 6m output terminals T1 to T6m of the driver IC 300 are connected to the 2m sets (6m) of the source lines SLr1 to SLrm, SLg1 to SLgm, and SLb1 to SLbm, each set of which includes three source lines configured with the R source line SLrj, the G source line SLgj, and the B source line SLb1.

In a case where the serial format original image signal DAin in units of pixel data configured with the R, G, and B subpixel data is input into the image signal preparation circuit 50 from the host 80, the image data of the i-th row display line indicated by the original image signal DAin is input into the image signal preparation circuit 50 one piece of pixel data at a time in an order corresponding to the arrangement order of the subpixel forming units 110 illustrated in FIG. 12. That is, in a case where one piece of pixel data configured with the R subpixel data Rji, the G subpixel data Gji, and the B subpixel data Bji is denoted by "(Rji, Gji, Bji)", 2m pieces of pixel data (R1i, G1i, B1i), (R2i, G2i, B2i), . . . , (R(2m)i, G(2m)i, B(2m)i) are input in this order into the image signal preparation circuit 50 one piece of pixel data at a time as the image data of the i-th row display line indicated by the original image signal DAin. The image signal preparation circuit 50 generates a serial image signal (hereinafter, referred to as an "i-th row image signal") DAo_i illustrated in FIG. 13A by changing the order of the 2m pieces of pixel data depending on the connection relationship between the output terminals T1 to T6m of the driver IC 300 and the source lines SL1 to SL6m in the target liquid crystal module 10 (refer to FIGS. 9A and 9B and FIG. 12). The prepared image signal DAout output from the image signal preparation circuit 50 includes the i-th row image signal DAo_i as a signal indicating the image data of the i-th row display line. Instead of generating the serial image signal in units of pixels illustrated in FIG. 13A as the i-th row image signal DAo_i, a serial image signal in units of subpixels illustrated in FIG. 13B may be generated as the i-th row image signal DAo_i.

Figure 14:
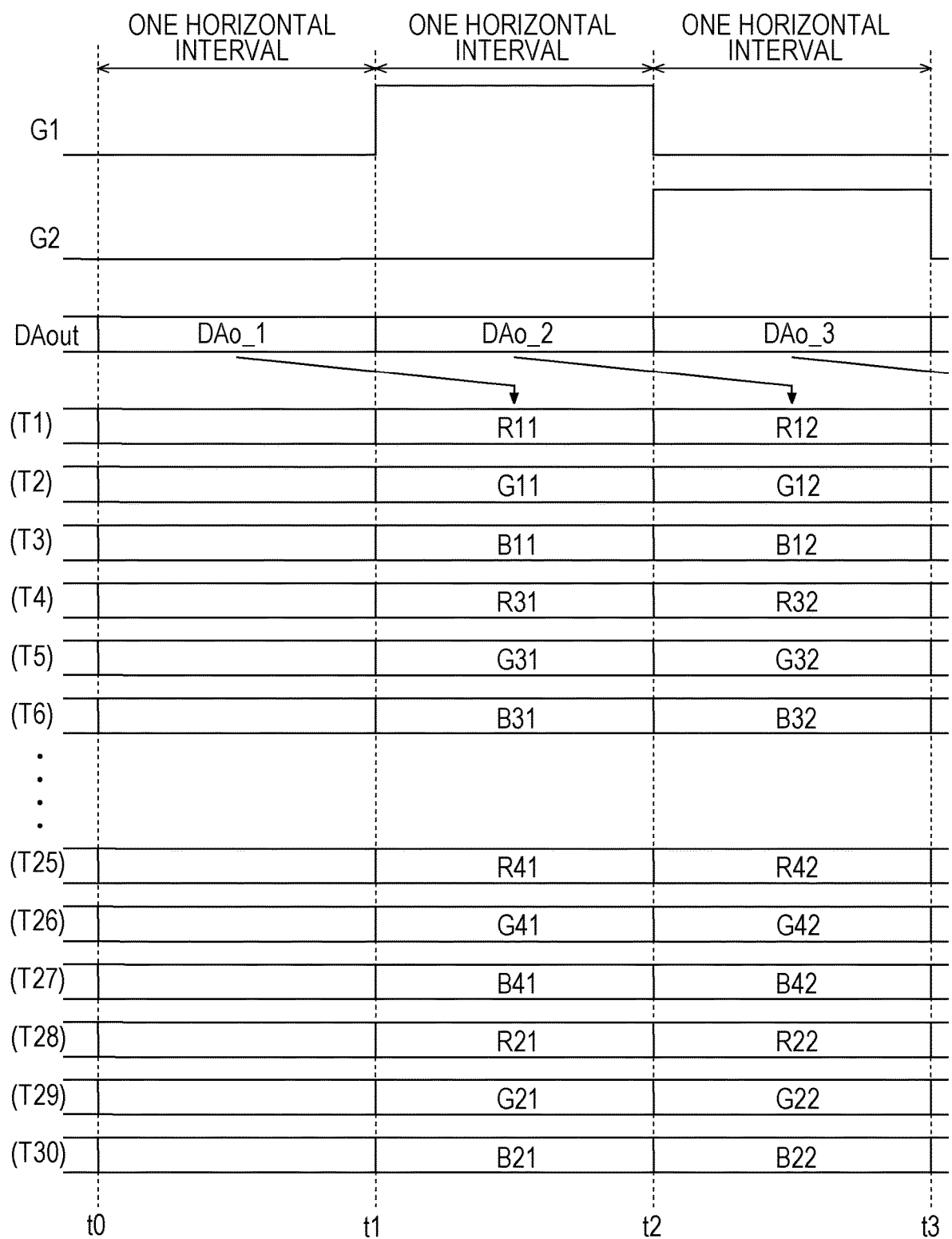
FIG. 14 is a time chart for describing actions and effects of the second embodiment.

In a case where such a prepared image signal DAout is input into the driver IC 300 of the target liquid crystal module 10, data signals are output from the output terminals T1 to T6m of the driver IC 300 in an arrangement order corresponding to the order of pixel data indicated by the i-th row image signal DAo_i included in the prepared image signal DAout. FIG. 14 is a time chart illustrating a relationship between the i-th row image signal DAo_i included in the prepared image signal DAout and the data signals output from the output terminals T1 to T6m of the driver IC 300 (m=5 in FIG. 14). In FIG. 14, the data signal output from each of the output terminals T1 to T6m (T1 to T30) is denoted by the reference sign "Xji" (X=R, G, B; j=1 to 2m; i=1 to n) of the subpixel data indicated by the data signal (the same applies to FIGS. 17, 20, and 25 described below). As illustrated in FIG. 14, for example, in a horizontal interval of t0 to t1, the serial format first row image signal DAo_1 is input into the driver IC 300 as the prepared image signal DAout. In the subsequent horizontal interval of t1 to t2, data signals respectively indicating the pieces of sub-pixel data R11, G11, B11, R31, G31, B31, . . . , R41, G41, B41, R21, G21, and B21 are respectively output from the output terminals T1 to T6m based on the first row image signal DAo_1.

Even in the present embodiment that is applied to a liquid crystal module in which each pixel is formed by three subpixel forming units configured with the R subpixel forming unit, the C subpixel forming unit, and the B subpixel forming unit, the original image signal DAin from the host 80 is converted into the prepared image signal DAout by the image signal preparation circuit 50 based on the connection relationship between the output terminals T1 to T6m of the driver IC 300 and the source lines SL1 to SL6m, and the prepared image signal DAout is input into the driver IC 300. Thus, even in a case where the liquid crystal module has a side terminal configuration, the source lines SL1 to SL6m are correctly driven by a typical driver IC without using a dedicated driver IC. Therefore, the same effect as the first embodiment is achieved in the present embodiment.

3. Third Embodiment

Next, the image signal preparation circuit 50 according to a third embodiment and the liquid crystal display module (target liquid crystal module) 10 that receives the prepared image signal DAout output from the image signal preparation circuit 50 will be described.

Figure 15:
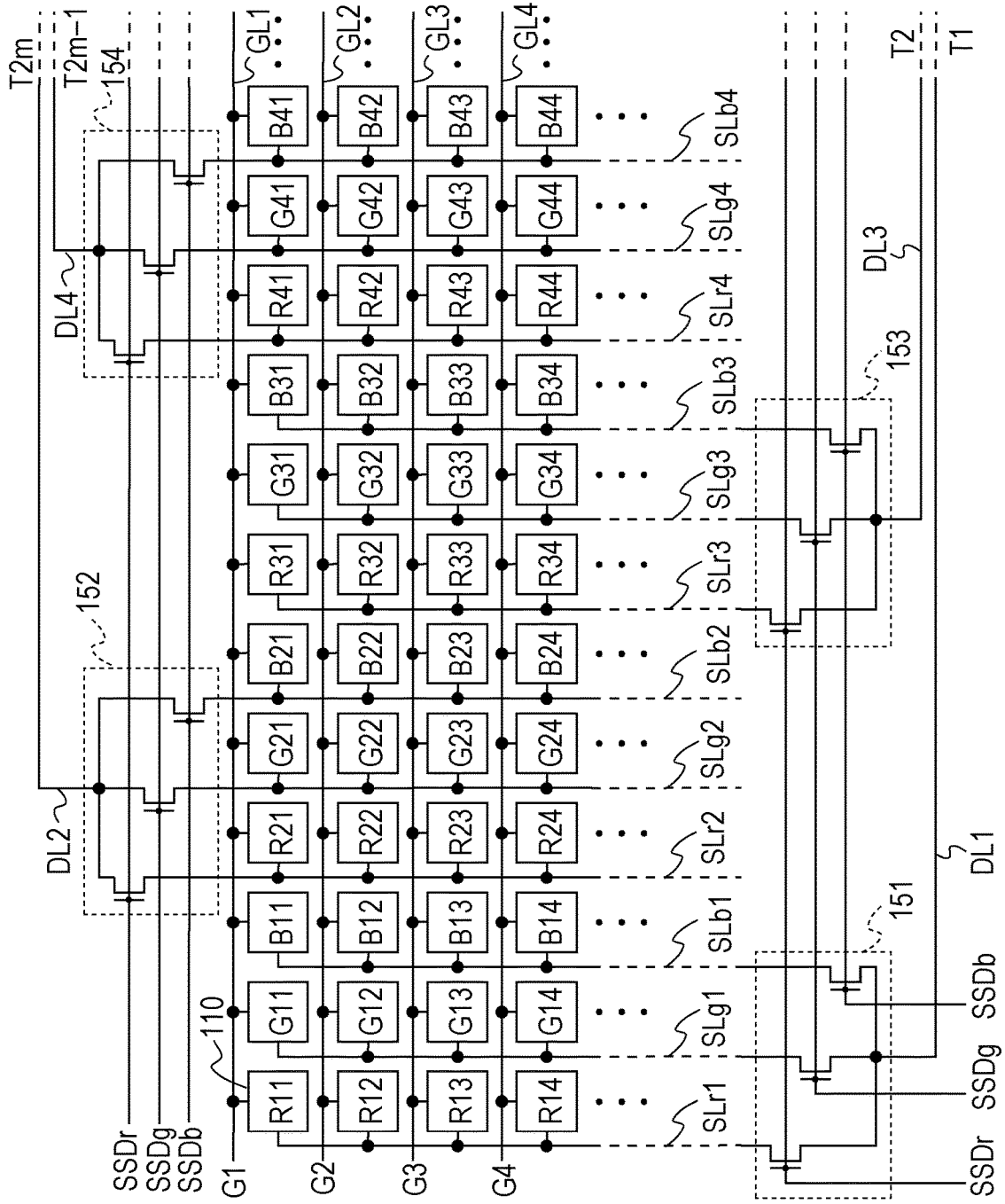
FIG. 15 is a diagram for describing a connection relationship between source lines of a display unit and output terminals of a driver IC in a target liquid crystal module of a third embodiment.

FIG. 15 is a diagram for describing a connection relationship between the output terminals T1 to T2m of the driver IC 300 and the source lines SLr1 to SLr2m, SLg1 to SLg2m, and SLb1 to SLb2m of the display unit 150 in the target liquid crystal module 10. In the same manner as the target liquid crystal module 10 of the second embodiment (refer to FIG. 12), the target liquid crystal module 10 displays a color image using three primary colors configured with red (R), green (G), and blue (B). Accordingly, an R subpixel forming unit, a G subpixel forming unit, and a B subpixel forming unit for respectively forming an R subpixel, a G subpixel, and a B subpixel are arranged adjacent to each other in the extending direction of the gate lines in the display unit 150. However, in the target liquid crystal module 10 of the present embodiment, in each set of the 2m sets of source line groups arranged in the display unit 150, the R source line SLr1, the G source line SLg1, and the B source line SLbj constituting the set are driven in a time division manner (hereinafter, this driving method will be referred to as a "source shared driving (SSD) method").

That is, 2m demultiplexers 151 to 15(2m) that respectively correspond to the 2m sets of source line groups are disposed in the display unit 150. Accordingly, the driver IC 300 includes 2m output terminals T1 to T2m and outputs data signals respectively indicating the R subpixel data, the G subpixel data, and the B subpixel data in a time division manner from each output terminal. Each demultiplexer 151 is configured using three TFTs as switching elements. Conducting terminals of the three switching elements are respectively connected to the R source line SLrj, the G source line SLgj, and the B source line SLbj in the corresponding set, and the other conducting terminals of the three switching elements are connected to each other and are connected to any output terminal of the driver IC 300 through a multiplexed data line DLj=1, 2, ..., 2m. That is, as illustrated in FIG. 15, the 2m demultiplexers 151 to 15(2m) respectively corresponding to the 2m sets of source line groups are respectively connected to the 2m output terminals T1 to T2m of the driver IC 300 in the same manner as the first embodiment through the 2m multiplexed data lines DL1 to DL2m. In a case where "SLj" (j=1 to 10) in FIGS. 8A and 8B that illustrate the connection relationship in the target liquid crystal module 10 of the first embodiment is replaced with "15j", FIGS. 8A and 8B are diagrams illustrating a relationship between the output terminals T1 to T2m and the demultiplexers 151 to 15(2m) in the target liquid crystal module 10 of the present embodiment (m=5 in FIGS. 8A and 8B).

In addition, connection control signals SSDr, SSDg, and SSDb for sequentially setting the three switching elements in each demultiplexer 151 to be in the ON state in each horizontal interval without a temporal overlap therebetween are generated in the driver IC 300. Among the three switching elements in each demultiplexer 15j, the switching element connected to the R source line SLrj is provided with the connection control signal SSDr (hereinafter, referred to as an "R connection control signal SSDr"). The switching element connected to the G source line SLg is provided with the connection control signal SSDg (hereinafter, referred to as a "G connection control signal SSDg"). The switching element connected to the B source line SLbj is provided with the connection control signal SSDb (hereinafter, referred to as a "B connection control signal SSDb").

Figure 16:
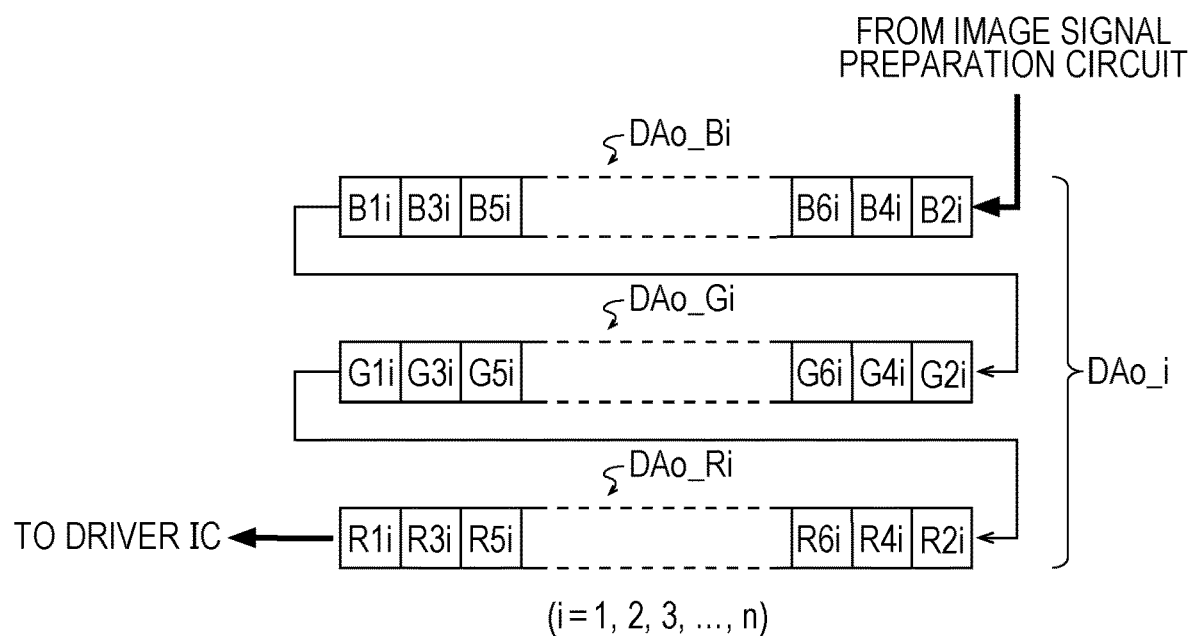
FIG. 16 is a diagram illustrating a prepared image signal output from an image signal preparation circuit according to the third embodiment.

In a case where the serial format original image signal DAin in units of subpixel data is input into the image signal preparation circuit 50 from the host 80, the image data of the i-th row display line indicated by the original image signal DAin is input into the image signal preparation circuit 50 one piece of subpixel data at a time in an order corresponding to the arrangement order of the subpixel forming units 110 illustrated in FIG. 15. That is, as the image data of the i-th row display line indicated by the original image signal DAin, 6m pieces of subpixel data R1i, G1i, B1i, R2i, G2i, B2i, ..., R(2m)i, G(2m)i, and B(2m)i are input in this order into the image signal preparation circuit 50 one piece of subpixel data at a time. The image signal preparation circuit 50 generates the serial format image signal (hereinafter, referred to as an "i-th row multiplexed image signal") DAo_i illustrated in FIG. 16 by changing the order of the 6m pieces of subpixel data considering the operation (demultiplexing) of each demultiplexer 15j depending on the connection relationship between the output terminals T1 to T2m of the driver IC 300 and the demultiplexers 151 to 15(2m) in the target liquid crystal module 10 (refer to FIGS. 9A. and 9B and FIG. 15). The i-th row multiplexed image signal DAo_i is a serial signal in units of subpixels in which an i-th row R image signal DAo_Ri, an i-th row G image signal DAo_Gi, and an i-th row B image signal DAo_Bi are connected in order. The prepared image signal DAout output from the image signal preparation circuit 50 includes the i-th row multiplexed image signal DAo_i as a signal indicating the image data of the i-th row display line.

In the present embodiment, each horizontal interval is configured with an R interval Tr, a G interval Tg, and a B interval Tb. In a case where the prepared image signal DAout including the i-th row R image signal DA0_Ri, the i-th row C image signal DAo_Gi, and the i-th row B image signal DAo_Bi is input into the driver IC 300 of the target liquid crystal module 10, data signals are output from the output terminals T1 to T2m of the driver IC 300 in an arrangement order corresponding to the order of 2m pieces of R subpixel data indicated by the i-th row R image signal DAo_Ri in the R interval Tr in the horizontal interval in which the i-th gate line GLi is selected. In the G interval Tg, data signals are output from the output terminals T1 to T2m of the driver IC 300 in an arrangement order corresponding to the order of 2m pieces of G subpixel data indicated by the i-th row C image signal DAo_Gi. In the B interval Tb, data signals are output from the output terminals T1 to T2m of the driver IC 300 in an arrangement order corresponding to the order of 2m pieces of B subpixel data indicated by the i-th row B image signal DAo_Bi.

Figure 17:
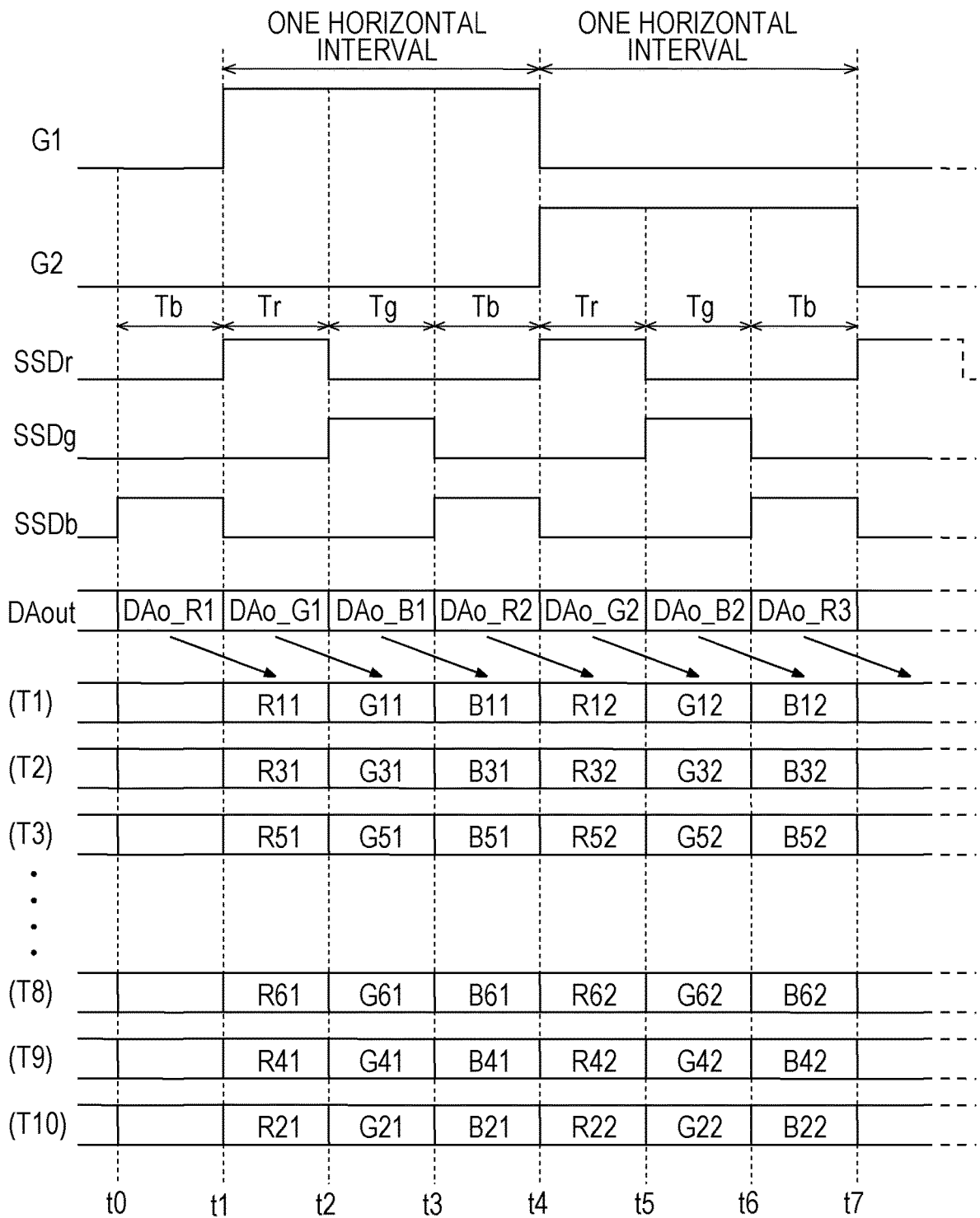
FIG. 17 is a time chart for describing actions and effects of the third embodiment.

FIG. 17 is a time chart illustrating a relationship between the i-th row R image signal DAo_Ri, the i-th row G image signal DAo_Gi, and the i-th row B image signal DAo_Bi included in the prepared image signal DAout and the data signals output from the output terminals T1 to T2m of the driver IC 300. As illustrated in FIG. 17, for example, during the B interval Tb (t0 to t1) immediately before a horizontal interval of t1 to t4 in which the first row gate line GL1 is selected, the serial format first row R image signal DAo_R1 is input into the driver IC 300 as the prepared image signal DAout. In the R interval Tr (t1 to t2) in the horizontal interval of t1 to t4, data signals respectively indicating the pieces of subpixel data R11, R31, R51, ..., R61, R41, and R21 are respectively output from the output terminals T1 to 12m based on the first row R image signal DAo_R1. In the R interval Tr (t1 to t2), since the R connection control signal SSDr is at the high level (active), the data signals output from the output terminals T1 to T2m are respectively applied to the R source lines SLr1, SLr3, SLr5, ..., SLr6, SLr4, and SLr2 based on the connection relationship between the output terminals T1 to T2m and the demultiplexers 151 to 15(2m). In addition, during the R interval Tr (t1 to t2), the serial format first row G image signal DAo_G1 is input into the driver IC 300 as the prepared image signal DAout. In the G interval Tg (t2 to t3), data signals respectively indicating the pieces of subpixel data G11, G31, G51, ..., G61, G41, and G21 are respectively output from the output terminals T1 to T2m based on the first row G image signal DAo_G1. In the G interval Tg (t2 to t3), since the G connection control signal SSDg is at the high level (active), the data signals output from the output terminals T1 to T2m are respectively applied to the G source lines SLg1, SLg3, SLg5, ..., SLg6, SLg4, and SLg2. In addition, during the G interval Tg (t2 to t3), the serial format first row B image signal DAo_B1 is input into the driver IC 300 as the prepared image signal DAout. In the B interval Tb (t3 to t4), data signals respectively indicating the pieces of subpixel data B11, B31, B51, . . . , B61, B41, and B21 are respectively output from the output terminals T1 to 12m based on the first row B image signal DAo_B1. In the B interval Tb (t3 to t4), since the B connection control signal SSDb is at the high level (active), the data signals output from the output terminals T1 to T2m are respectively applied to the B source lines SLb1, SLb5, . . . , SLb6, SLb4, and SLb2.

Even in the present embodiment applied to a liquid crystal module that uses the SSD method and is configured by forming each pixel with three subpixel forming units configured with the R subpixel forming unit, the G subpixel forming unit, and the B subpixel forming unit, the original image signal DAin from the host 80 is converted into the prepared image signal DAout by the image signal preparation circuit 50 based on the connection relationship between the output terminals T1 to T2m of the driver IC 300 and the demultiplexers 151 to 15(2m), and the prepared image signal DAout is input into the driver IC 300. Thus, even in a case where the liquid crystal module has a side terminal configuration, the source lines SLr1 to SLr2m, SLg1 to SLg2m, and SLb1 to SLb2m are correctly driven by a typical driver IC without using a dedicated driver IC. Therefore, the same effect as the first embodiment is achieved in the present embodiment.

4. Fourth Embodiment

Next, the image signal preparation circuit 50 according to a fourth embodiment and the liquid crystal display module (target liquid crystal module) 10 that receives the prepared image signal DAout output from the image signal preparation circuit 50 will be described.

Figure 18:
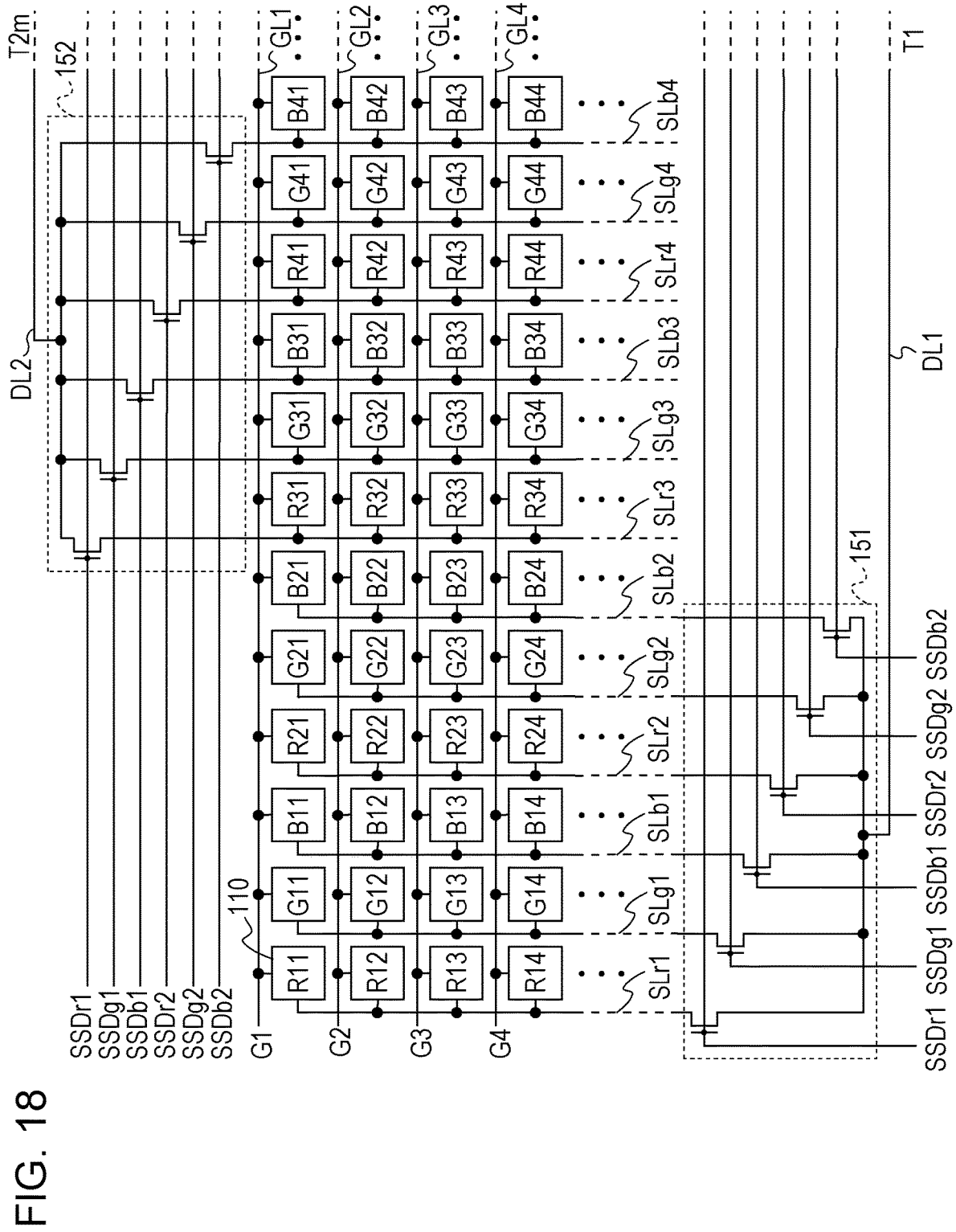
FIG. 18 is a diagram for describing a connection relationship between source lines of a display unit and output terminals of a driver IC in a target liquid crystal module of a fourth embodiment.

FIG. 18 is a diagram for describing a connection relationship between the output terminals T1 to T2m of the driver IC 300 and source lines SLr1 to SLr4m, SLg1 to SLg4m, and SLb1 to SLb4m of the display unit 150 in the target liquid crystal module 10. In the same manner as the target liquid crystal module of the second and third embodiments (refer to FIG. 12 and FIG. 15), the target liquid crystal module 10 displays a color image using three primary colors configured with red (R), green (G), and blue (B). Accordingly, an R subpixel forming unit, a G subpixel forming unit, and a B subpixel forming unit for respectively forming an R subpixel, a G subpixel, and a B subpixel are arranged adjacent to each other in the extending direction of the gate lines in the display unit 150. In addition, the target liquid crystal module 10 of the present embodiment employs the SSD method in the same manner as the target liquid crystal module 10 of the third embodiment but is different from the target liquid crystal module 10 of the third embodiment in that the multiplicity of its SSD method is six.

That is, in the target liquid crystal module 10 of the present embodiment, 2m sets of source line groups (12m source lines), each set of which includes six adjacent source lines configured with the R source line SLr2j−1, the G source line SLg2j−1, the B source line SLb2j−1, the R source line SLr2j, the G source line SLg2j, and the B source line SLb2j, are arranged (j=1 to 2m). Accordingly, the driver IC 300 includes 2m output terminals T1 to T2m. In each set of source line groups arranged in the display unit 150, the six source lines SLr2j−1, SLg2j−1, SLb2j−1, SLr2j, SLg2j, and SLb2j constituting the set are driven in a time division manner.

In order to do so, the 2m demultiplexers 151 to 15(2m) that respectively correspond to the 2m sets of source line groups are disposed in the display unit 150. In each horizontal interval, the driver IC 300 outputs data signals respectively indicating six pieces of subpixel data of two pixels configured with the R subpixel data, the G subpixel data, and the B subpixel data from each output terminal T1 in a time division manner. Each demultiplexer 15j is configured using six TFTs as switching elements. Conducting terminals of the six switching elements are respectively connected to the P source line SLr2j−1, the G source line SLg2j−1, the B source line SLb2j−1 the R source line SLr2j, the G source line SLg2j, and the B source line SLb2j in the corresponding set, and the other conducting terminals of the six switching elements are connected to each other and are connected to any output terminal of the driver IC 300 through the multiplexed data line DLj (j=1 to 2m). That is, as illustrated in FIG. 18, the 2m demultiplexers 151 to 15(2m) respectively corresponding to the 2m sets of source line groups are respectively connected to the 2m output terminals T1 to T2m of the driver IC 300 in the same manner as the first and third embodiments through the 2m multiplexed data lines DL1 to DL2m.

In addition, connection control signals SSDr1, SSDg1, SSDb1, SSDr2, SDDg2, and SSDb2 for sequentially setting the six switching elements in each demultiplexer 15j to be in the ON state in each horizontal interval without a temporal overlap therebetween are generated in the driver IC 300. Among the six switching elements in each demultiplexer 15j, the switching element connected to the odd-numbered R source line SLr2j−1 is provided with the connection control signal SSDr1 (hereinafter, referred to as a "first R connection control signal SSDr1"). The switching element connected to the odd-numbered G source line SLg2j−1 is provided with the connection control signal SSDg1 (hereinafter, referred to as a "first G connection control signal SSDg1"). The switching element connected to the odd-numbered B source line SLb2j−1 is provided with the connection control signal SSDb1 (hereinafter, referred to as a "first B connection control signal SSDb1"). The switching element connected to the even-numbered R source line SLr2j is provided with the connection control signal SSDr2 (hereinafter, referred to as a "second a connection control signal SSDr2"). The switching element connected to the even-numbered G source line SLg2j is provided with the connection control signal SSDg2 (hereinafter, referred to as a "second G connection control signal SSDg2"). The switching element connected to the even-numbered B source line SLb2j is provided with the connection control signal SSDb2 (hereinafter, referred to as a "second B connection control signal SSDb2").

Figure 19:
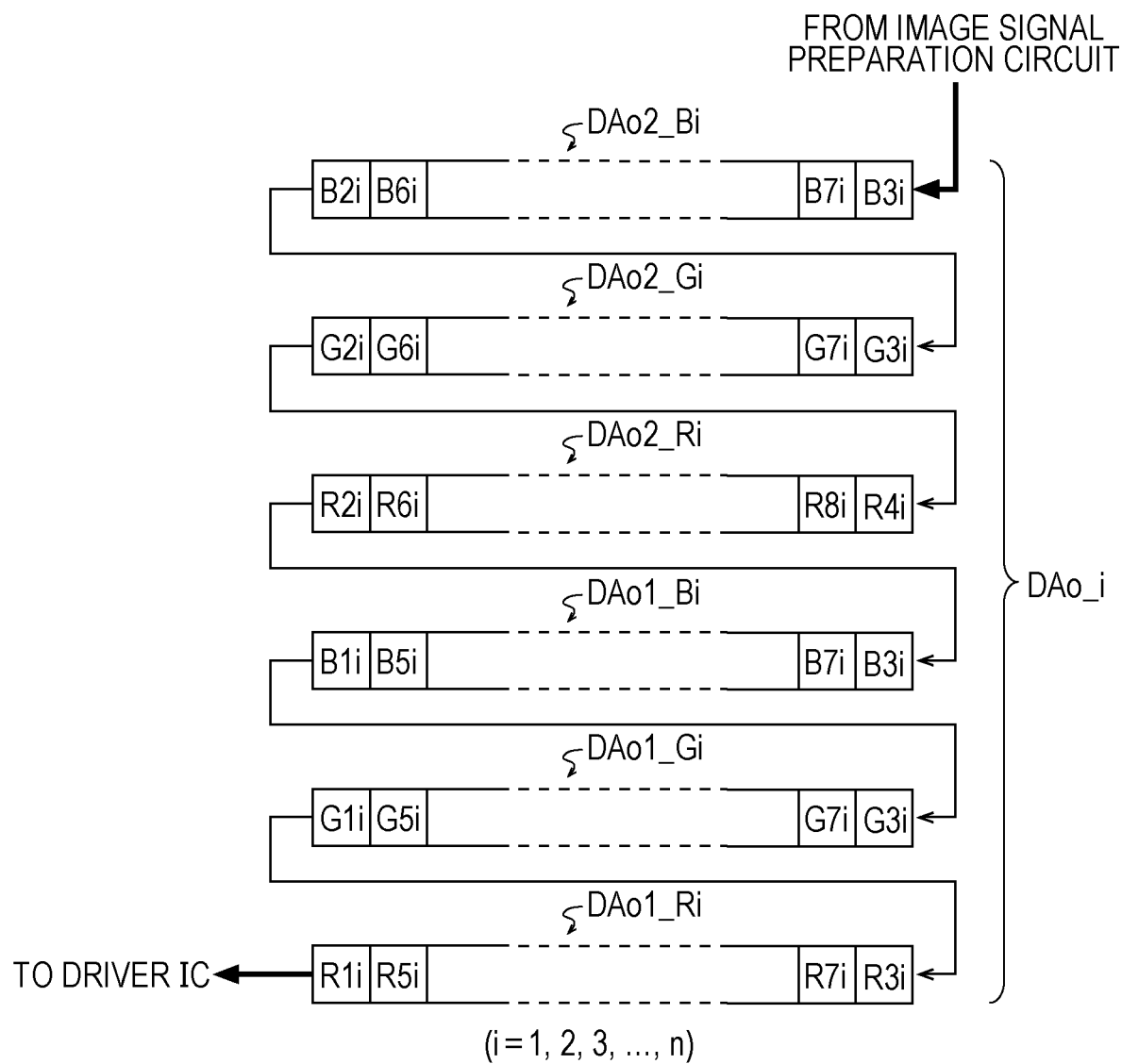
FIG. 19 is a diagram illustrating a prepared image signal output from an image signal preparation circuit according to the fourth embodiment.

In a case where the serial format original image signal DAin in units of subpixel data is input into the image signal preparation circuit 50 from the host 80, the image data of the i-th row display line indicated by the original image signal DAin is input into the image signal preparation circuit 50 one piece of subpixel data at a time in an order corresponding to the arrangement order of the subpixel forming units 110 illustrated in FIG. 18. That is, as the image data of the i-th row display line indicated by the original image signal DAin, 12m pieces of subpixel data R1i, G1i, B1i, R2i, G2i, B2i, . . . , R(4m)i, G(4m)i, and B(4m)i are input in this order into the image signal preparation circuit 50 one piece of subpixel data at a time. The image signal preparation circuit 50 generates the serial image signal (hereinafter, referred to as the "i-th row multiplexed image signal") DAo_i illustrated in FIG. 19 by changing the order of the 12m pieces of subpixel data considering the operation (demultiplexing) of each demultiplexer 15j depending on the connection relationship between the output terminals T1 to T2$m$ of the driver Tr 300 and the demultiplexers 151 to 15(2$m$) in the target liquid crystal module 10 (refer to FIGS. 9A and 9B and FIG. 18). The i-th row multiplexed image signal DAo_i is a serial signal in units of subpixels in which the i-th row first R image signal DAo1_Ri, the i-th row first G image signal DAo1_Gi, the i-th row first B image signal DAo1_Bi, the i-th row second R image signal DAo2_Ri, the i-th row second G image signal DAo2_Gi, and the i-th row second B image signal DAo2_Bi are connected in order. The prepared image signal DAout output from the image signal preparation circuit 50 includes the i-th row multiplexed image signal DAo_i as a signal indicating the image data of the i-th row display line.

In the present embodiment, each horizontal interval is configured with a first R interval Tr1, a first G interval Tg1, a first B interval Tb1, a second R interval Tr2, a second G interval Tg2, and a second B interval Tb2. In a case where the prepared image signal DAout including the i-th row first R image signal DAo1_Ri, the i-th row first G image signal DAo1_Gi, the i-th row first B image signal DAo1_Bi, the i-th row second R image signal DAo2_Ri, the i-th row second G image signal DAo2_Gi, and the i-th row second B image signal DAo2_Bi is input into the driver IC 300 of the target liquid crystal module 10, data signals are output from the output terminals T1 to T2$m$ of the driver IC 300 in an arrangement order corresponding to the order of 2m pieces of R subpixel data indicated by the i-th row first R image signal DAo1_Ri in the first R interval Tr1 in the horizontal interval in which the i-th gate line GLi is selected. In the first G interval Tg1, the data signals are output in an arrangement order corresponding to the order of 2m pieces of G subpixel data indicated by the i-th row first G image signal DAo1_Gi. In the first B interval Tb1, the data signals are output in an arrangement order corresponding to the order of 2m pieces of B subpixel data indicated by the i-th row first B image signal DAo1_Bi. In the second R interval Tr2, the data signals are output in an arrangement order corresponding to the order of 2m pieces of R subpixel data indicated by the i-th row second R image signal DAo2_Ri. In the second G interval Tg2, the data signals are output in an arrangement order corresponding to the order of 2m pieces of G subpixel data indicated by the i-th row second G image signal DAo2_Gi. In the second B interval Tb2, the data signals are output in an arrangement order corresponding to the order of 2m pieces of B subpixel data indicated by the i-th row second B image signal DAo2_Bi.

Figure 20:
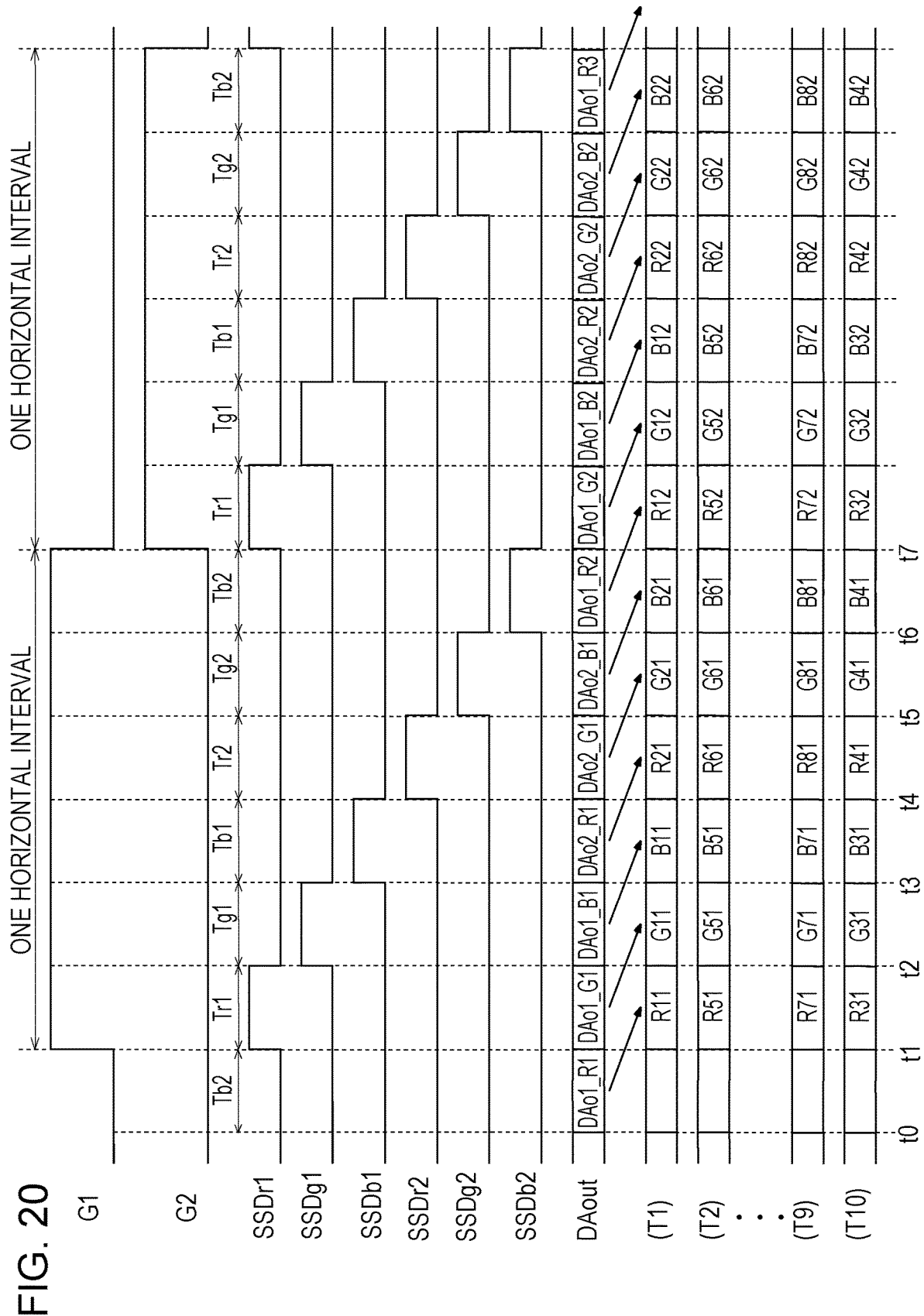
FIG. 20 is a time chart for describing actions and effects of the fourth embodiment.

FIG. 20 is a time chart illustrating a relationship between the i-th row first R image signal DAo1_Ri, the i-th row first G image signal DAo1_Gi, the i-th row first B image signal DAo1_Bi, the i-th row second R image signal DAo2_Ri, the i-th row second G image signal DAo2_Gi, and the i-th row second B image signal DAo2_Bi included in the prepared image signal DAout and the data signals output from the output terminals T1 to T2$m$ of the driver IC 300. In the example illustrated in FIG. 20, m=5 is established. As illustrated in FIG. 20, for example, during the second B interval Tb2 (t0 to t1) immediately before a horizontal interval of t1 to t7 in which the first row gate line GL1 is selected, the serial format first row first R image signal DAo1_R1 is input into the driver IC 300 as the prepared image signal DAout. In the first R interval Tr1 (t1 to t2) in the horizontal interval of t1 to t7, data signals respectively indicating 10 pieces of subpixel data R11, R51, . . . , R71, and R31 are respectively output from the output terminals T1 to T10 based on the first row first R image signal DAo1_R1. In the first R interval Tr1 (t1 to t2), since the first R connection control signal SSDr1 is at the high level (active), the data signals output from the output terminals T1 to T10 are respectively applied to the odd-numbered R source lines SLr1, SLr5, . . . , SLr7, and SLr3 based on the connection relationship between the output terminals T1 to T10 and the demultiplexers 151 to 15(10). In addition, during the first R interval Tr1 (t1 to t2), the serial format first row first G image signal DAo1_Gi is input into the driver IC 300 as the prepared image signal DAout. In the first G interval Tg1 (t2 to t3), data signals respectively indicating 10 pieces of subpixel data G11, G51, . . . , G71, and G31 are respectively output from the output terminals T1 to T10 based on the first row first G image signal DAo1_Gi. In the first G interval Tg1 (t2 to t3), since the first G connection control signal SSDg1 is at the high level (active), the data signals output from the output terminals T1 to T10 are respectively applied to the odd-numbered G source lines SLg1, SLg5, . . . , m SLg7, and SLg3. In addition, during the first G interval Tg1 (t2 to t3), the serial format first row first B image signal DAo1_B1 is input into the driver IC 300 as the prepared image signal DAout. In the first B interval Tb1 (t3 to t4), data signals respectively indicating 10 pieces of subpixel data B11, B51, . . . , B71, and B31 are respectively output from the output terminals T1 to T10 based on the first row first B image signal DAo1_B1. In the first B interval Tb1 (t3 to t4), since the first B connection control signal SSDb1 is at the high level (active), the data signals output from the output terminals T1 to T10 are respectively applied to the odd-numbered B source lines SLb1, SLb5, . . . , SLb7, and SLb3.

Even in the present embodiment applied to a liquid crystal module that uses the SSD method having a multiplicity of six and is configured by forming each pixel with three subpixel forming units configured with the R subpixel forming unit, the G subpixel forming unit, and the B subpixel forming unit, the original image signal DAin from the host 80 is converted into the prepared image signal DAout by the image signal preparation circuit 50 based on the connection relationship between the output terminals T1 to T2$m$ of the driver IC 300 and the demultiplexers 151 to 15(2$m$), and the prepared image signal DAout is input into the driver IC 300. Thus, even in a case where the liquid crystal module has a side terminal configuration, the source lines SLr1 to SLr4$m$, SLg1 to SLg4$m$, and SLb1 to SLb4$m$ are correctly driven by a typical driver IC without using a dedicated driver IC. Therefore, the same effect as the first embodiment is achieved in the present embodiment.

5. Fifth Embodiment

Next, the image signal preparation circuit 50 according to a fifth embodiment and the liquid crystal display module (target liquid crystal module) 10 that receives the prepared image signal DAout output from the image signal preparation circuit 50 will be described.

Figure 21:
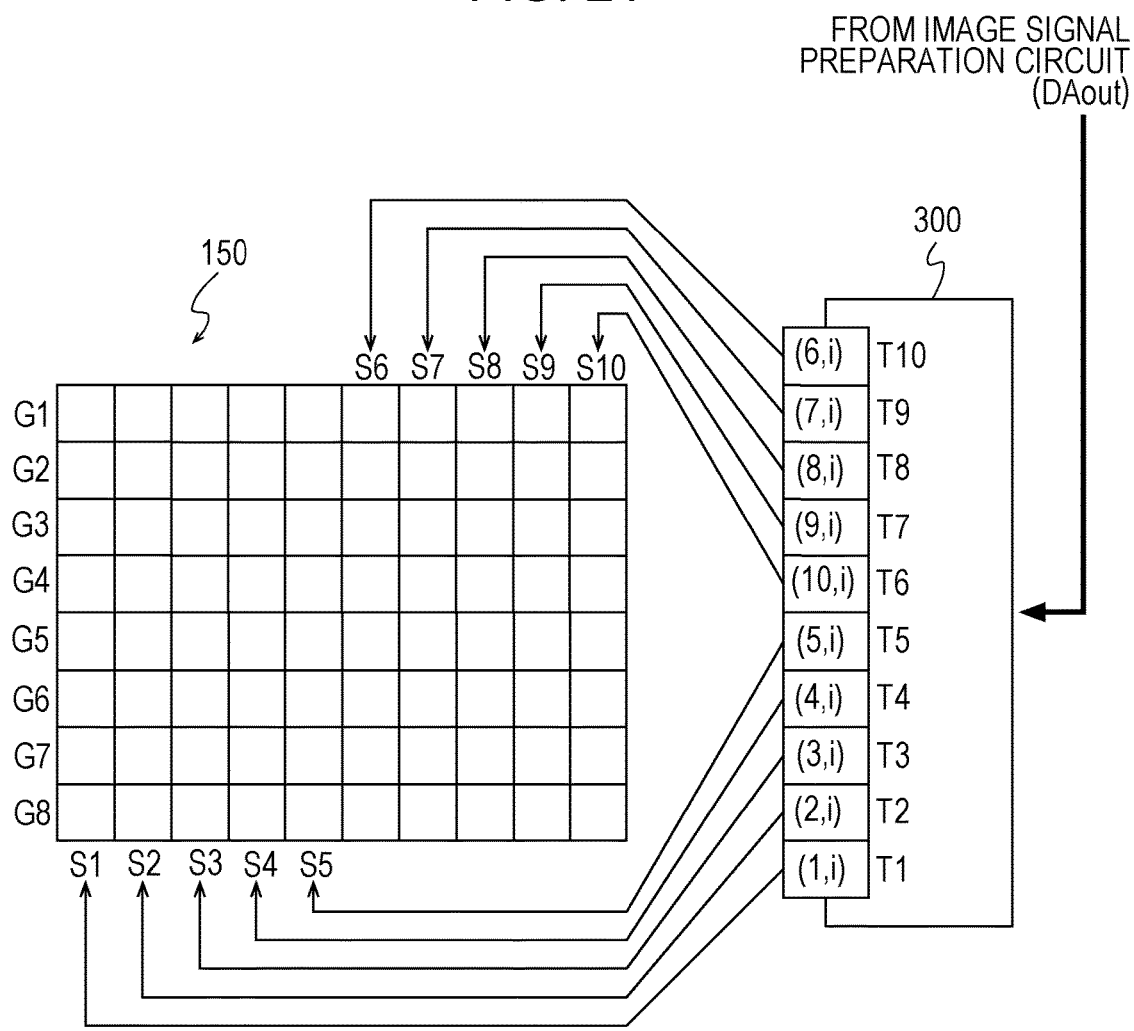
FIG. 21 is a diagram for describing a connection relationship between source lines of a display unit and output terminals of a driver IC in a target liquid crystal module of a fifth embodiment.

FIG. 21 is a diagram for describing a connection relationship between the output terminals T1 to T2$m$ of the driver IC 300 and the source lines SL1 to SL2$m$ of the display unit 150 in the target liquid crystal module 10 (in the example illustrated in FIG. 21, m=5 and n=8 are established). As illustrated in FIG. 21, in the target liquid crystal module 10, the first half output terminals T1 to T5 in the driver IC 300 are respectively connected to the first half source lines SL1 to SL5 to which the data signals S1 to S5 are to be applied. The second half output terminals T6 to T10 in the driver IC 300 are respectively connected to the second half source lines SL10 to SL6 to which the data signals S10 to S6 are to be applied. That is, the first half output terminal Tk (k=1 to 5) is connected to the first half source line SLk, and the second half output terminal T5+k is connected to the second half source line SL11-k.

In a case where the seral format original image signal DAin in units of pixel data is input into the image signal preparation circuit 50 from the host 80, the image data of the i-th row display line indicated by the original image signal DAin is input into the image signal preparation circuit 50 one piece of pixel data at a time in an order corresponding to the arrangement order of the pixel forming units 110. That is, in a case where pieces of pixel data indicated by the data signals S1 to S10 to be respectively applied to the source lines SL1 to SL10 when the i-th gate line GLi is selected are denoted by d(1,i) to d(10,i), 10 pieces of pixel data d(1,i), d(2,i), . . . , d(10,i) as the image data of the i-th row display line indicated by the original image signal DAin are input in this order into the image signal preparation circuit 50 one piece of pixel data at a time. The image signal preparation circuit 50 generates the serial image signal (hereinafter, referred to as the "i-th row image signal") DAo_ i illustrated in FIG. 22 by changing the order of the 10 pieces of pixel data depending on the connection relationship between the output terminals T1 to T10 of the driver IC 300 and the source lines SL1 to SL10 in the target liquid crystal module 10 (refer to FIG. 21). The prepared image signal DAout output from the image signal preparation circuit 50 includes the i-th row image signal DAo_i as a signal indicating the image data of the i-th row display line.

Figure 22:
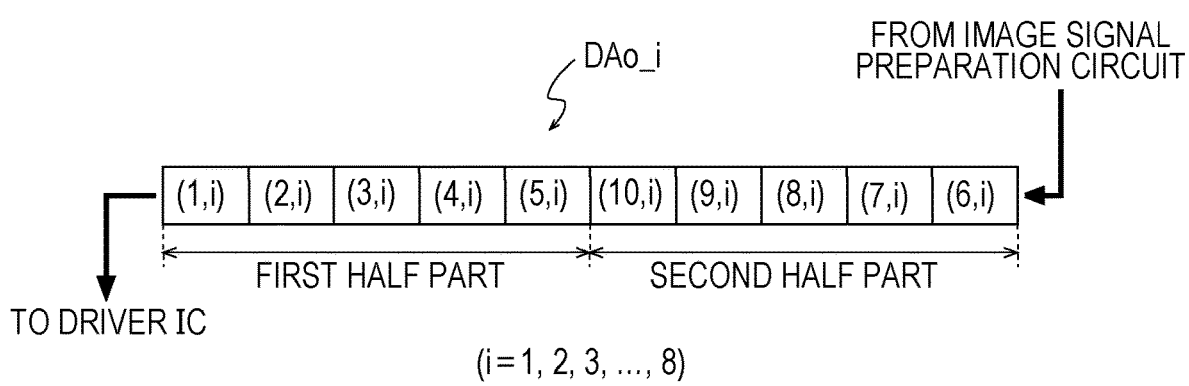
FIG. 22 is a diagram illustrating a prepared image signal output from an image signal preparation circuit according to the fifth embodiment.

In the example illustrated in FIG. 22, the original image signal DAin is converted into the prepared image signal DAout for every one display line. However, as illustrated in FIG. 21, since the first half output terminals T1 to T5 are respectively connected to the first half source lines SL1 to SL5, and the second half output terminals T6 to T10 are respectively connected to the second half source lines SL10 to SL6, the original image signal DAin may be converted into the prepared image signal DAout for every ½ display lines. In the case of the connection relationship illustrated in FIG. 21, the original image signal DAin can be used as the prepared image signal DAout in the first half part of each display line (pieces of pixel data d(1,i) to d(5,i)). Thus, the conversion may be performed on only the second half part (pieces of pixel data d(6,i) to d(10,i)) of each display line.

Even in the present embodiment, the original image signal DAin from the host 80 is converted in to the prepared image signal DAout by the image signal preparation circuit 50 based on the connection relationship between the output terminals T1 to T2m of the driver IC 300 and the source lines SL1 to SL2m of the display unit 150, and the prepared image signal DAout is input into the driver IC 300. Thus, even in a case where the liquid crystal module has a side terminal configuration, the source lines SL1 to SL2m are correctly driven by a typical driver IC without using a dedicated driver IC. Therefore, the same effect as the first embodiment is achieved in the present embodiment.

6. Sixth Embodiment

Next, the image signal preparation circuit 50 according to a sixth embodiment and the liquid crystal-display module (target liquid crystal module) 10 that receives the prepared image signal DAout output from the image signal preparation circuit 50 will be described.

Figure 23:
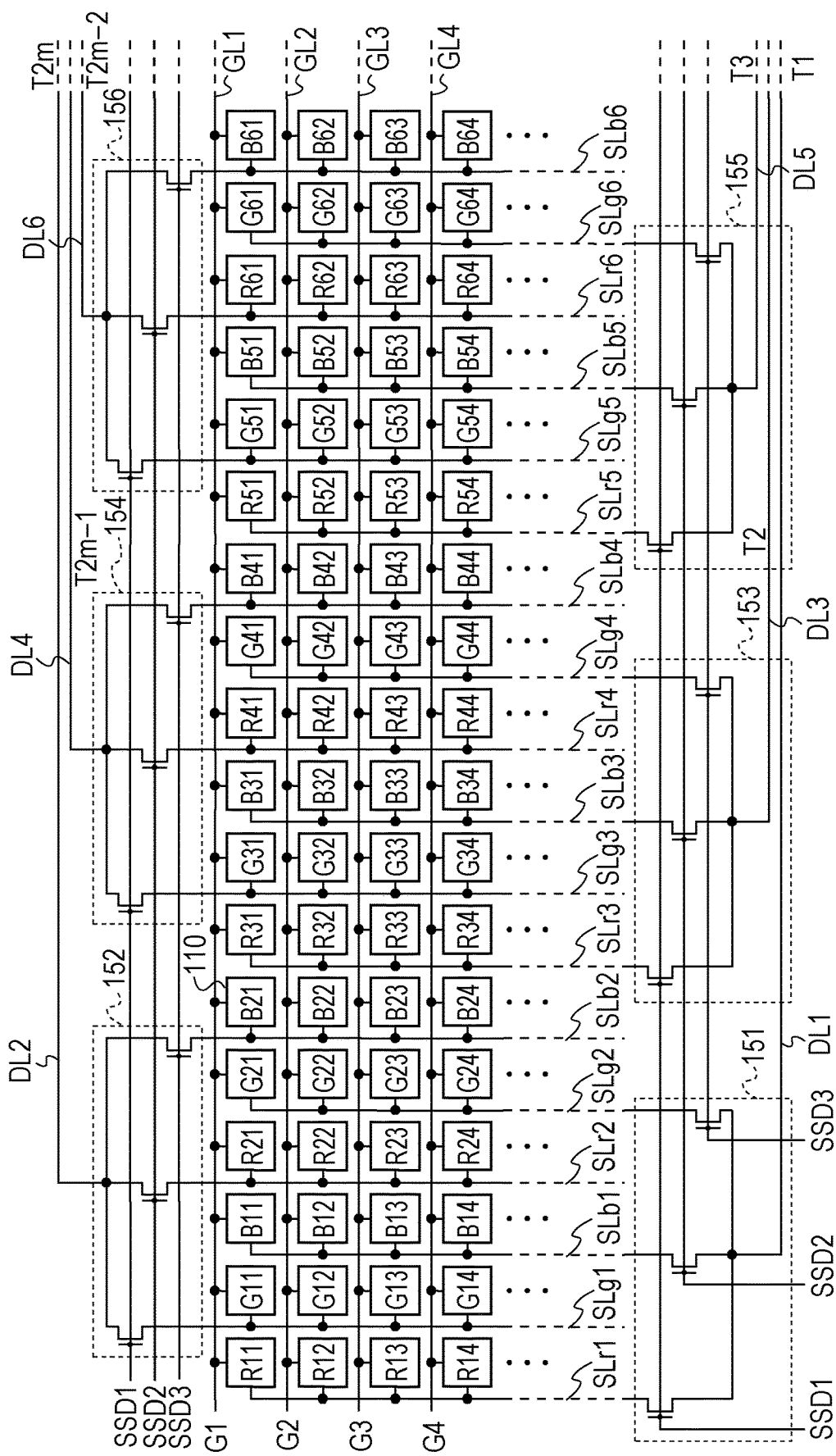
FIG. 23 is a diagram for describing a connection relationship between source lines of a display unit and output terminals of a driver IC in a target liquid crystal module of a sixth embodiment.

FIG. 23 is a diagram for describing a connection relationship be the output terminals T1 to T2m of the driver IC 300 and the source lines SLr1 to SLr2m, SLg1 to SLg2m, and SLb1 to SLb2m of the display unit 150 in the target liquid crystal module 10. In the same manner as the target liquid crystal module of the second to fourth embodiments (refer to FIGS. 12, 15, and 18), the target liquid crystal module 10 displays a color image using three primary colors configured with red (R), green (G), and blue (B). Accordingly, an R subpixel forming unit, a C subpixel forming unit, and a B subpixel forming unit for respectively forming an R subpixel, a C subpixel, and a B subpixel are arranged adjacent to each other in the extending direction of the gate lines in the display unit 150. In addition, the target liquid crystal module 10 of the present embodiment employs the SSD method having a multiplicity of three in the same manner as the target liquid crystal module 10 of the third embodiment. However, the target liquid crystal module 10 of the present embodiment is different from the target liquid crystal module 10 of the third embodiment, which employs the SSD method with adjacent three source lines as one set (refer to FIG. 15), in that the target liquid crystal module 10 of the present embodiment employs the SSD method (hereinafter, referred to as "comb teeth wiring SSD") with three source lines, each of which is selected from every two lines (refer to FIG. 23).

As illustrated in FIG. 23, 2m demultiplexers 151 to 15(2m) that respectively correspond to the 2m sets of source line groups are disposed in the display unit 150. Accordingly, the driver IC 300 includes 2m output terminals T1 to T2m and outputs data signals respectively indicating the R subpixel data, the G subpixel data, and the B subpixel data in a time division manner from each output terminal. Each demultiplexer 15j is configured using three TFTs as switching elements. Conducting terminals of the three switching elements are respectively connected to the three source lines (the R source line, the G source line, and the B source line) in the corresponding set, and the other conducting terminals of the three switching elements are connected to each other and are connected to any output terminal of the driver IC 300 through the multiplexed data line DLj (j=1 to 2m). That is, as illustrated in FIG. 23, the 2m demultiplexers 151 to 15(2m) respectively corresponding to the 2m sets of source line groups are respectively connected to the 2m output terminals T1 to T2m of the driver IC 300 in the same manner as the first embodiment through the 2m multiplexed data lines DL1 to DL2m.

In addition, first, second, and third connection control signals SSD1, SSD2, and SSD3 for sequentially setting the three switching elements in each demultiplexer 15j to be in the ON state in each horizontal interval without a temporal overlap therebetween are generated in the driver IC 300. Among the three switching elements in each demultiplexer 15j, the switching element connected to the first source line is provided with the first connection control signal SSD1. The switching element connected to the second source line is provided with the second connection control signal SSD2. The switching element connected to the third source line is provided with the third connection control signal SSD3.

Figure 24:
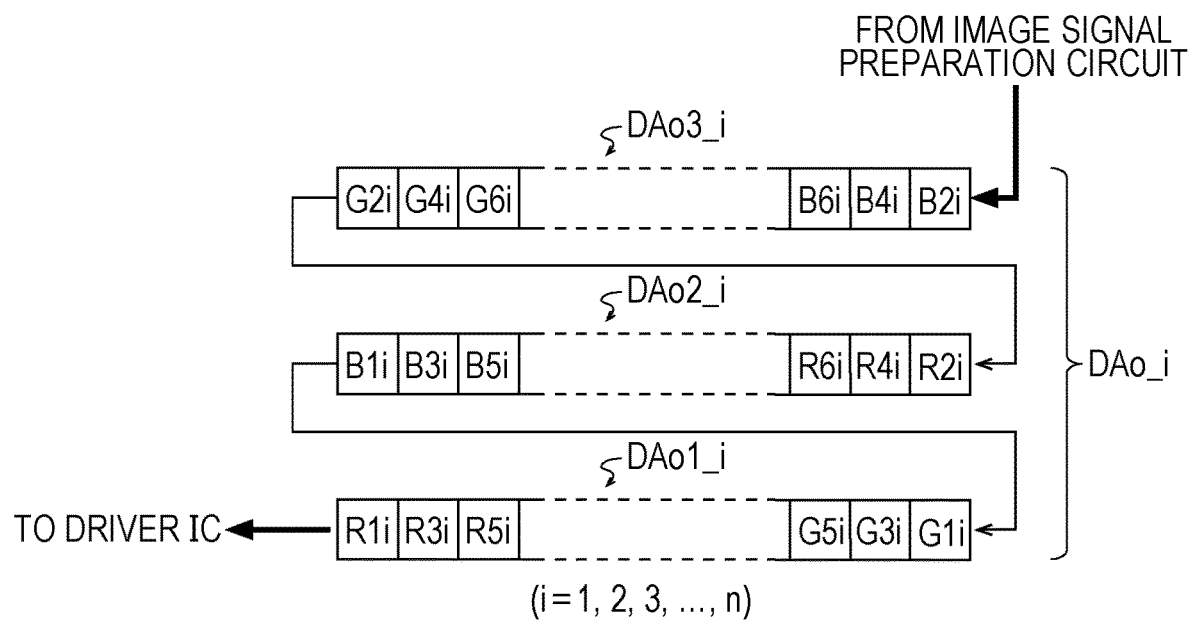
FIG. 24 is a diagram illustrating a prepared image signal output from an image signal preparation circuit according to the sixth embodiment.

In the present embodiment, the image data of the i-th row display line indicated by the original image signal DAin is input into the image signal preparation circuit 50 one piece of subpixel data at a time in an order corresponding to the arrangement order of the subpixel forming units 110 illustrated in FIG. 23. That is, as the image data of the i-th row display line indicated by the original image signal DAin, 6m pieces of subpixel data R1i, G1i, B1i, R2i, G2i, B2i, . . . , R(2m)i, G(2m)i, and B(2m)i are input in this order into the image signal preparation circuit 50 one piece of subpixel data at a time. The image signal preparation circuit 50 generates the serial image signal (hereinafter, referred to as the "i-th row multiplexed image signal") DAo_i illustrated in FIG. 24 by changing the order of the 6m pieces of subpixel data considering the operation (demultiplexing) of each demultiplexer 15j depending on the connection relationship between the output terminals T1 to T2m of the driver IC 300 and the demultiplexers 151 to 15(2m) in the target liquid crystal module 10 (refer to FIGS. 9A and 9B and FIG. 23). The i-th row multiplexed image signal DAo_i is a serial signal in units of subpixels in which an i-th row first image signal DAo1_i, an i-th row second image signal DAo2_i, and an i-th row third image signal DAo3_i are connected in order. The prepared image signal DAout output from the image signal preparation circuit 50 includes the i-th row multiplexed image signal DAo_i as a signal indicating the image data of the i-th row display line.

In the present embodiment, each horizontal interval is configured with a first interval Th1, a second interval Th2, and a third interval Th3. In a case where the prepared image signal DAout including the i-th row first image signal DAo1_i, the i-th row second image signal DAo2_i, and the i-th row third image signal DAo3_i is input into the driver IC 300 of the target liquid crystal module 10, data signals are output from the output terminals T1 to T2m of the driver IC 300 in an arrangement order corresponding to the order of 2m pieces of subpixel data indicated by the i-th row first image signal Do1_i in the first interval Th1 in the horizontal interval in which the i-th gate line GLi is selected. In the second interval Th2, data signals are output from the output terminals T1 to T2m of the driver IC 300 in an arrangement order corresponding to the order of 2m pieces of subpixel data indicated by the i-th row second image signal DAo2_i. In the third interval Th3, data signals are output from the output terminals T1 to T2m of the driver IC 300 in an arrangement order corresponding to the order of 2m pieces of subpixel data indicated by the i-th row third image signal DAo3_i.

Figure 25:
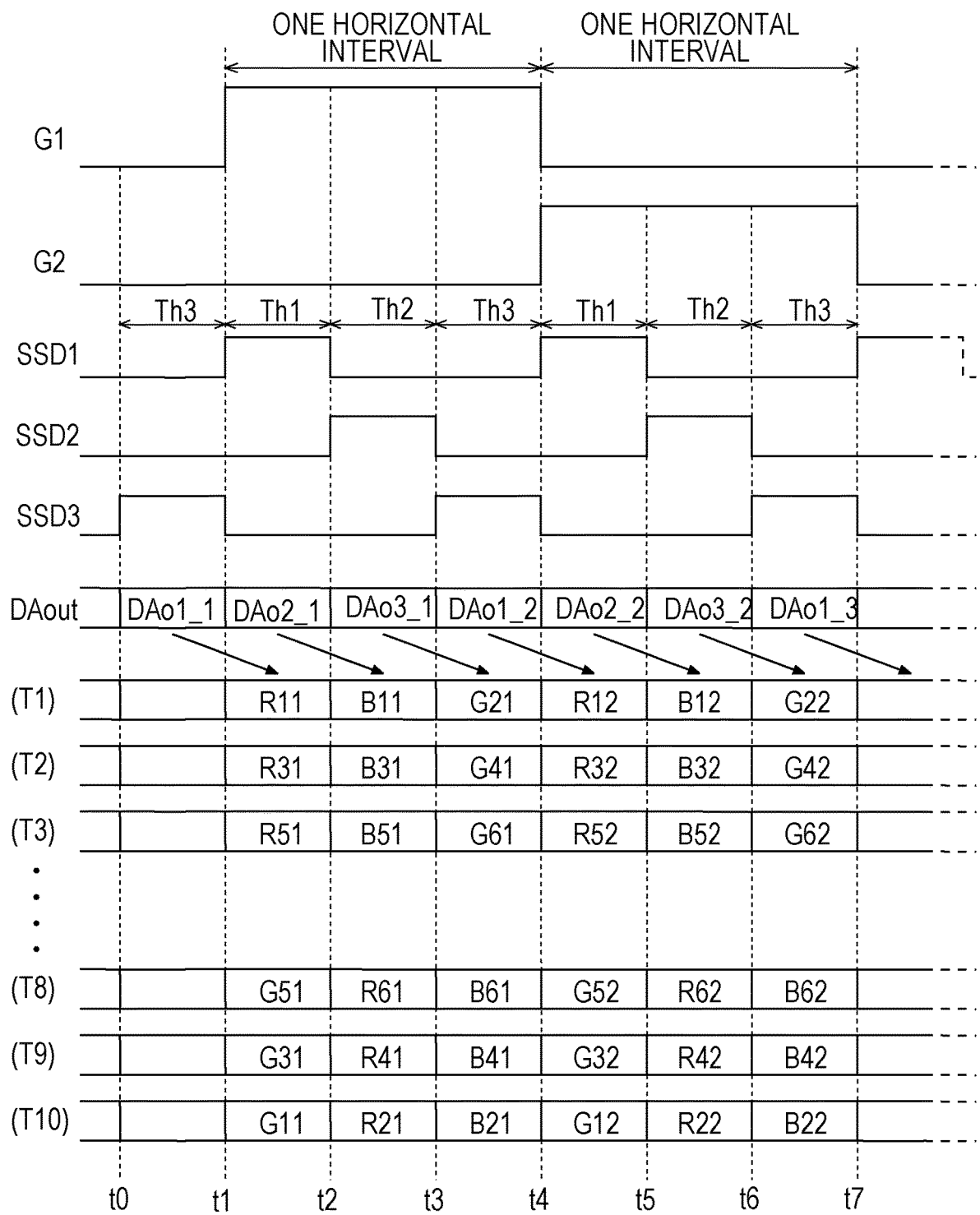
FIG. 25 is a time chart for describing actions and effects of the sixth embodiment.

FIG. 25 is a time chart illustrating a relationship between the i-th row first image signal DAo1_i, the i-th row second image signal DAo2_i, and the i-th row third image signal DAo3_i included in the prepared image signal DAout and the data signals output from the output terminals T1 to T2m of the driver IC 300. As illustrated in FIG. 25, for example, during the third interval Th3 (t0 to t1) immediately before a horizontal interval of t1 to t4 in which the first row gate line GL1 is selected, the serial format first row first image signal DAo1_1 is input into the driver IC 300 as the prepared image signal DAout. In the first interval Th1 (t1 to t2) in the horizontal interval of t1 to t4, data signals respectively indicating the pieces of subpixel data R11, R31, R51, . . . , G51, G31, and G11 are respectively output from the output terminals T1 to T2m based on the first row first image signal DAo1_1. In the first interval Th1 (t1 to t2), since the first connection control signal SSD1 is at the high level (active), the data signals output from the output terminals T1 to T2m are respectively applied to the source lines SLr1, SLr3, SLr5, . . . , SLg5, SLg3, and SLg1 based on the connection relationship between the output terminals T1 to T2m and the demultiplexers 151 to 15(2m). In addition, during the first interval Th1 (t1 to t2), the serial format first row second image signal DAo2_1 is input into the driver IC 300 as the prepared image signal DAout. In the second interval Th2 (t2 to t3), data signals respectively indicating the pieces of subpixel data B11, B31, B51, . . . , R61, R41, and R21 are respectively output from the output terminals T1 to T2m based on the first row second image signal DAo2_1. In the second interval Th2 (t2 to t3), since the second connection control signal SSD2 is at the high level (active), the data signals output from the output terminals T1 to T2m are respectively applied to the source lines SLb1, SLb3, SLb5, . . . , SLr6, SLr4, and SLr2. In addition, during the second interval Th2 (t2 to t3), the serial format first row third image signal DAo3_1 is input into the driver IC 300 as the prepared image signal DAout. In the third interval Th3 (t3 to t4), data signals respectively indicating the pieces of subpixel data G21, G41, G61, . . . , B61, B41, and B21 are respectively output from the output terminals T1 to T2m based on the first row third image signal DAo3_1. In the third interval Th3 (t3 to t4), since the third connection control signal SSD3 is at the high level (active), the data signals output from the output terminals T1 to T2m are respectively applied to the source lines SLg2, SLg4, SLg6, . . . , SLb6, SLb4, and SLb2.

Even in the present embodiment applied to a liquid crystal module that uses the comb teeth wiring SSD method and is configured by forming each pixel with three subpixel forming units configured with the R subpixel forming unit, the G subpixel forming unit, and the B subpixel forming unit, the original image signal DAin from the host 80 is converted into the prepared image signal DAout by the image signal preparation circuit 50 based on the connection relationship between the output terminals T1 to T2m of the driver IC 300 and the demultiplexers 151 to 15(2m), and the prepared image signal DAout is input into the driver IC 300. Thus, even in a case where the liquid crystal module has a side terminal configuration, the source lines SLr1 to SLr2m, SLg1 to SLg2m, and SLb1 to SLb2m are correctly driven by a typical driver IC without using a dedicated driver IC. Therefore, the same effect as the first embodiment is achieved in the present embodiment.

The comb teeth wiring SSD method (refer to FIG. 23) employed in the target liquid crystal module 10 of the present embodiment is effective for low electric power consumption in a case where a so-called column inversion driving method, a Z-inversion (zig zag) method, or a dot inversion driving method is used as an inversion driving method.

7. Seventh Embodiment

While the image signal preparation circuit 50 according to the first to sixth embodiments is configured such that its function of generating the prepared image signal DAout from the original image signal DAM based on the connection relationship between the output terminals T1 to T2m of the driver IC 300 and the source lines SL1 to SL2m in the display unit 150 of the liquid crystal panel 100 is implemented by hardware, the function corresponding to the image signal preparation circuit 50 can also be implemented by software. For example, the function corresponding to the image signal preparation circuit 50 may be implemented as a part of a device driver that is software controlling the target liquid crystal module 10 in the host 80. In this case, the host 80 includes elements constituting a computer, that is, a memory for storing a plurality of programs for implementing various functions and image data representing an image to be displayed, and a central processing unit (CPU) that can execute the plurality of programs. In the host 80, the function corresponding to the image signal preparation circuit 50 is implemented by software by causing the CPU to execute a predetermined program (for example, a program, or a specific program included therein, that is provided as a device driver or the like corresponding to the liquid crystal module 10; hereinafter, referred to as an "image signal preparation program") among the plurality of programs. The plurality of programs are installed in a ROM or the like as a recording medium readable by the CPU in the host 80 before the target apparatus including the liquid crystal module 10 and the host 80 is made available on the market by its manufacturer. In addition, at least the image signal preparation program among the plurality of programs may be provided as a portable recording medium such as a compact disc read only memory (CD-ROM) or a Universal Serial Bus (USB) memory (USB flash drive) on which the program is recorded, and the image signal preparation program may be installed in the ROM or the like in the host 80 from the portable recording medium through an interface (not illustrated) of the host 80. Furthermore, the image signal preparation program may be installed in the ROM or the like in the host 80 from a predetermined external server through a network and a communication unit (not illustrated).

Figure 26:
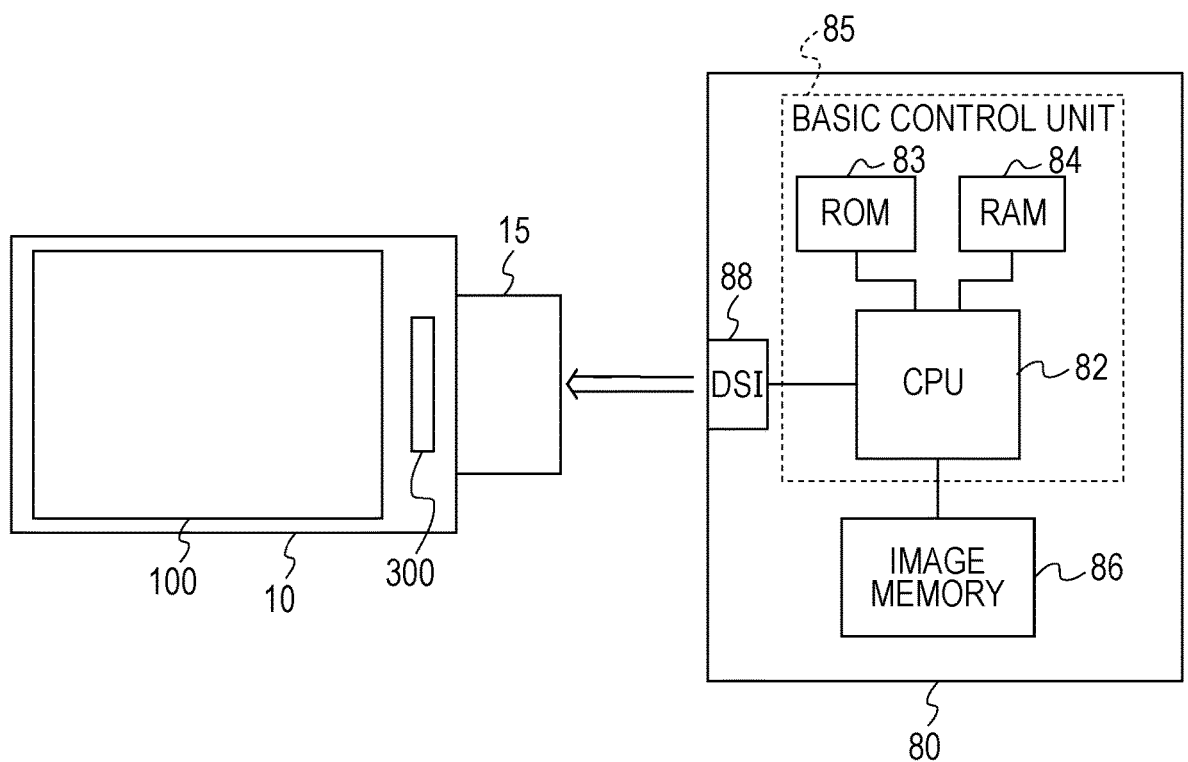
FIG. 26 is a block diagram illustrating an overall configuration of an apparatus (target apparatus) that uses an image signal preparation program according to a seventh embodiment.
Figure 29A:
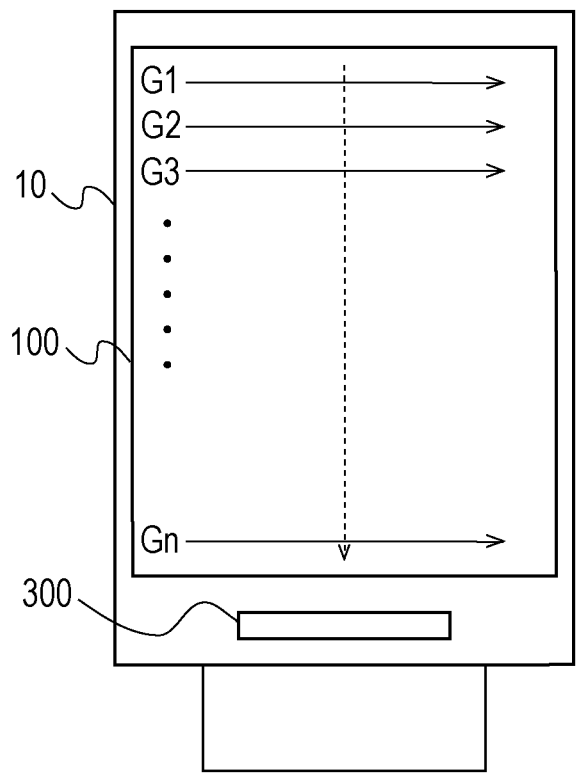
FIG. 29A is a diagram illustrating a portrait liquid crystal module.
Figure 29B:
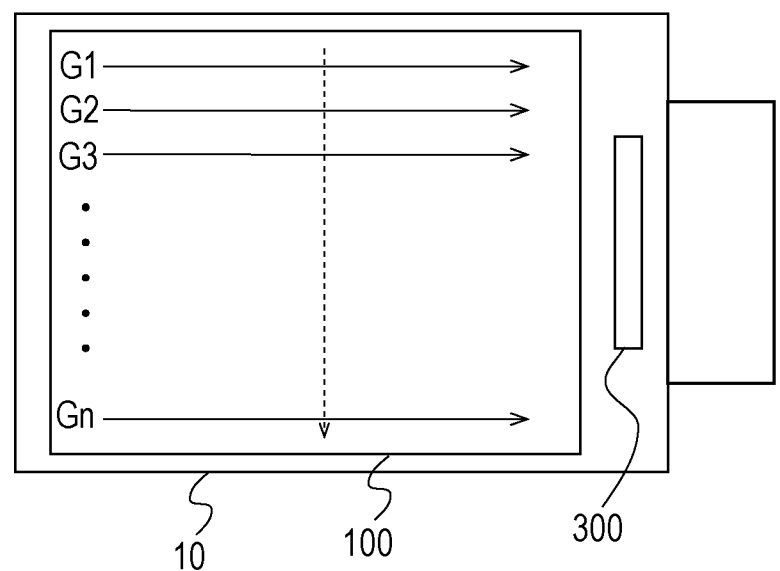
FIG. 29B is a diagram illustrating a landscape liquid crystal module including a side terminal configuration.

Hereinafter, one example of a configuration that implements the function of the image signal preparation circuit 50 by software in the host 80 will be described as a seventh embodiment. FIG. 26 is a block diagram illustrating an overall configuration of an apparatus (target apparatus) that uses an image signal preparation program according to the seventh embodiment. This target apparatus is, for example, a digital still camera (DSC). In this case, the host 80 includes a capturing unit and an input operation unit, not illustrated, as a part of the host 80 in addition to the constituents illustrated in FIG. 26. The configuration of the liquid crystal module 10 in the target apparatus illustrated in FIG. 26 is the same as the configuration of the liquid crystal module 10 in a case where the form of mounting in FIG. 2A is employed in the first embodiment, and thus, will not be described in detail.

As illustrated in FIG. 26, the host 80 in the target apparatus includes a basic control unit 85, an image memory 86, and a DST unit 88. The basic control unit 85 performs a process or control for implementing various functions to be provided by the target apparatus and includes a central processing unit (CPU) 82, a read only memory (ROM) 83, and a random access memory (RAM) 84. That is, various functions of the target apparatus are implemented by causing the CPU 82 to perform a desired process or control each unit by executing a program (a program such as an operating system including a device driver) stored in the ROM 83 in the basic control unit 85. The image memory 86 is a memory for storing an image to be displayed in the liquid crystal module 10 and is configured to be readable and writable by the CPU 82. The DSI unit 88 is an interface circuit on the host side for exchanging data with the liquid crystal module 10. While the DST unit 88 is an interface circuit that complies with the display serial interface (DSI) standard suggested by Mobile industry Processor Interface (MIPI) Alliance, an interface circuit based on other appropriate standards may be used instead or in addition.

In a case where the target apparatus is a DSC, the host 80, by causing the CPU 82 to execute the program stored in the ROM 83, stores image data representing an image acquired by capturing the outside scenery, a person, or the like using the capturing unit not illustrated) based on an operation performed on the input operation unit (not illustrated) by a user in the image memory 86 and supplies an image signal corresponding to the image data to the liquid crystal module 10 to display the image on the display unit 150 in the liquid crystal panel 100.

FIG. 27 is a flowchart illustrating an image signal preparation process based on the image signal preparation program according to the present embodiment. When the image data is stored in the image memory 86, the image signal corresponding to the image data is supplied to the driver IC 300 in the liquid crystal module 10 as the prepared image signal DAout in order to display the image represented by the image data in the liquid crystal module 10. At this point, the supply of the prepared image signal DAout to the driver IC 300 is implemented by causing the CPU 82 in the host 80 to execute the image signal preparation program. That is, at this point, the CPU 82 operates as follows based on the image signal preparation program (refer to FIG. 27). In the following description, for convenience of description, assumptions are made such that n=8 and m=5 are established, and the image data illustrated in FIG. 10A is stored in the image memory 86 as the pixel data d(j,i) (i=1 to n, j=1 to 2m) of a two-dimensional array.

In the image signal preparation process, a variable i that specifies a display line in an image to be displayed, and a variable i that specifies a pixel in one display line are introduced. In addition, an index conversion table C[1] to C[2m] for converting the variable j specifying a pixel in one display line into a variable jc that specifies another pixel in the same display line is prepared in advance (stored in the ROM 83 or the RAM 84). FIG. 28 illustrates an index conversion table corresponding to FIGS. 8A and 8d that illustrate the connection relationship between the output terminals T1 to T10 of the driver IC 300 and the source lines SL1 to SL10 of the display unit 150 (2m=10).

As illustrated in FIG. 27, in the image signal preparation process, first, both of the variables i and j are initialized to "1" (steps S12 and S14). Then, the variable j as an index specifying a pixel in the pieces of pixel data d(1,i) to d(2m,i) in the display line (hereinafter, referred to as a "current display line") specified by the variable i is converted into the variable jc using the index conversion table in FIG. 27 (step S16). Next, the pixel data d(jc,i) is read from the image memory 86 using the variable jc and is output to the DSI unit 88.

Then, a determination as to whether or not the value of the variable j is less than the number 2m of pixels of one display line is performed (in the case of the image data illustrated in FIG. 10A, 2m=10). As a result of this determination, in a case where the value of the variable j is less than 2m, the value of the variable j is increased by one (step S22), and then, a return is made to step S16. Then, steps S16 to S22 are iteratively executed until the value of the variable j becomes equal to 2m. In a case where the value of the variable i becomes equal to 2m during the execution, a transition is made to step S24.

In step S24, a determination as to whether or not the value of the variable i specifying the current display line is less than the number n of display lines is performed. As a result of this determination, in a case where the value of the variable i is less than the number n of display lines, the value of the variable i is increased by one (step S26), and then, a return is made to step S14. Then, steps S14 to S26 are iteratively executed until the value of the variable i becomes equal to n. In a case where the value of the variable i becomes equal to n during the execution, the image signal preparation process is finished.

According to the image signal preparation process, the variable j as the index specifying a pixel in each display line is converted into the variable jc using the index conversion table C[1] to C[2m] (step S16). Accordingly, each piece of pixel data is read from the pieces of pixel data d(1,1) to d(2m,n) of a two-dimensional array as the image data in the image memory 86 in an order corresponding to the connection relationship between the output terminals T1 to T2m of the driver IC 300 and the source lines SL1 to SL2m. Thus, the same prepared image signal DAout as the prepared image signal DAout (refer to FIG. 11A) in the first embodiment is generated. The prepared image signal DAout that is generated in such a manner is supplied to the driver IC 300 in the liquid crystal module 10 through the DSI unit 88. Consequently, for example, as illustrated in FIG. 3, even in a case where the output terminals T1 to T2m and the source lines SL1 to SL2m are connected such that the arrangement order of the output terminals T1 to T2m of the driver IC 300 does not correspond to the arrangement order of the source lines SL1 to SL2m, the source lines SL1 to SL2m are correctly driven by the driver IC 300 (refer to FIG. 11B).

According to the present embodiment, the function corresponding to the image signal preparation circuit 50 according to the first embodiment is implemented by software, and the same effect as the first embodiment is achieved. In addition, as is understood from the above description related to the present embodiment (refer to FIG. 26 to FIG. 28), the function corresponding to the image signal preparation circuit 50 in the second to sixth embodiments, that is, the function of generating the prepared image signal DAout illustrated in each of FIGS. 13, 16, 19, 22, and 24, can also be implemented by software.

8. Modification Example

The present disclosure is not limited to the embodiments. Various modifications can be carried out without departing from the scope of the present disclosure. Hereinafter, modification examples of the embodiments will be described. In the configuration of the modification examples described below, the same or corresponding parts as in the embodiments will be designated by the same reference signs and may not be described.

While the memory 54 in the image signal preparation circuit 50 according to the first embodiment includes two line memories, the memory 54 may include three or more line memories. For example, in a case where the memory 54 includes p line memories (p≥3), the image data indicated by the original image signal DAin received from the host 80 is circularly written one display line at a time into the p line memories. The image data of the display line that is written at the earliest time among the pieces of image data of the p display lines stored in the p line memories is read and provided to the driver IC 300. More generally, the memory 54 may include two or more line memories The two or more line memories may operate as a memory that uses a first in first out (FIFO) method in units of display lines. The order of writing or reading of the pixel data constituting the image data of each display line may be configured to correspond to the connection relationship between the output terminals T1 to T2m of the driver IC 300 and the source lines SL1 to SL2m. of the display unit 150.

In the target liquid crystal module 10 of the first embodiment, while the first half output terminals T1 to T5 of the driver IC 300 are connected to the odd-numbered source lines SL1, SL3, . . . , SL9, and the second half output terminals T10 to T6 are connected to the even-numbered source lines SL2, SL4, . . . , SL10, the connection relationship is not limited thereto. Even in a case where the connection relationship between the output terminals of the driver IC 300 and the source lines of the display unit 150 is different from the connection relationship in the target liquid crystal module 10 of each embodiment (refer to FIGS. 3, 12, 15, 18, 21, and 23), the same effect as the first embodiment is achieved by configuring the image signal preparation circuit 50 to convert the original image signal DAin into the prepared image signal DAout depending on the connection relationship between the output terminals of the driver IC 300 and the source lines of the display unit 150.

The image signal preparation circuit 50 according to each embodiment receives the display image signal from the host 80 as the serial format original image signal DAin (refer to FIGS. 1, 13A and 13B, and the like). However, in a case where the image signal preparation circuit 50 is mounted in the host 80 as illustrated in FIG. 2A, the display image signal may be input into the image signal preparation circuit 50 as a parallel format image signal. In addition, in this case, when the memory storing the image data representing the image to be displayed is included in the host 80, the image signal preparation circuit 50 may be configured to generate the prepared image signal DA by sequentially reading the plurality of pieces of pixel data or subpixel data corresponding to each display line from the memory in an order corresponding to the connection relationship between the output terminals T1 to T2m of the driver IC 300 and the source lines SL1 to SL2m or the demultiplexers 151 to 15(2m).

In addition, while the SSD method having a multiplicity of three or six is employed in the third, fourth, or sixth embodiment (refer to FIGS. 15, 18, and 23), the SSD method having a multiplicity of two may be employed, or the SSD method having a multiplicity of 4, 5, 7, or higher may be employed. For example, in a liquid crystal display device that displays a color image based on four primary colors of red (R), green (G), blue (B), and white (W), a plurality of data signal lines in a display unit may be grouped into m sets of data signal line groups, each set of which includes four data signal lines corresponding to the four primary colors, and the SSD method having a multiplicity of four may be employed.

While each embodiment is applied to a liquid crystal module as a matrix liquid crystal display device, each embodiment may be applied to other matrix display devices such as a matrix organic electro luminescence (EL) display device.

The present disclosure contains subject matter related to that disclosed in Japanese Priority Patent Application JP 2017-201921 filed in the Japan Patent Office on Oct. 18, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal preparation circuit that prepares an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the circuit comprising:
   a memory that stores, in units of display lines, image data representing a display image configured with a plurality of pixels to be formed by the plurality of pixel forming units;
   an input control circuit that receives the image data representing the display image and writes the image data into the memory; and an output control circuit that reads a plurality of pieces of pixel data representing each display line in the display image from the memory, wherein the drive circuit is implemented as an integrated circuit, and a plurality of output terminals of the integrated circuit and the plurality of data signal lines are connected such that an arrangement order of the plurality of output terminals does not correspond to an arrangement order of the plurality of data signal lines, and the output control circuit generates a serial image signal by serially reading the plurality of pieces of pixel data representing each display line from the memory in an order that corresponds to an order of the plurality of data signal lines associated with the arrangement order of the plurality of output terminals by a connection relationship between the plurality of output terminals and the plurality of data signal lines, and supplies the serial image signal to the integrated circuit.

2. The image signal preparation circuit according to claim 1, wherein the memory is configured to store image data of two or more display lines, the input control circuit circularly writes the image data representing the display image into the memory in units of display lines, and the output control circuit generates the serial image signal by serially reading the image data stored in the memory using a first in first output method in units of display lines.

3. The image signal preparation circuit according to claim 1, wherein the display image is a color image based on a predetermined number of primary colors, each pixel forming unit includes a predetermined number of subpixel forming units corresponding to the predetermined. number of primary colors, each subpixel forming unit corresponds to any one of the plurality of data signal lines and corresponds to any one of the plurality of scan signal lines, and the output control circuit generates the serial image signal by serially reading the plurality of pieces of pixel data representing each display line in the display image from the memory in units of pixels or in units of subpixels.

4. The image signal preparation circuit according to claim 3, wherein the plurality of output terminals respectively correspond to a plurality of sets of data signal line groups that are acquired by grouping the plurality of data signal lines, each set of which includes a predetermined number of data signal lines corresponding to the predetermined number of subpixel forming units corresponding to the predetermined number of primary colors, the drive circuit outputs, from each output terminal, a predetermined number of data signals to be respectively applied to the predetermined number of data signal lines in a set corresponding to the output terminal among a plurality of data signals to be applied to the plurality of data signal lines in a time division manner, and the output control circuit generates the serial image signal by serially reading the plurality of pieces of pixel data representing each display line in the display image from the memory in an order that corresponds to an order of the plurality of sets of data signal line groups associated with the arrangement order of the plurality of output terminals by the connection relationship.

5. The image signal preparation circuit according to claim 4, wherein the output control circuit generates the serial image signal by serially reading the plurality of pieces of pixel data representing each display line in the display image from the memory in an order that corresponds to an order of the plurality of sets of data signal line groups associated with the arrangement order of the plurality of output terminals by the connection relationship and corresponds to the time division output of the data signals.

6. The image signal preparation circuit according to claim 1, wherein the plurality of output terminals respectively correspond to a plurality of sets of data signal line groups that are acquired by grouping the plurality of data signal lines, each set of which includes two or more data signal lines, the drive circuit outputs, from each output terminal, two or more data signals to be respectively applied to two or more data signal lines in a set corresponding to the output terminal among a plurality of data signals to be applied to the plurality of data signal lines in a time division manner, and the output control circuit generates the serial image signal by serially reading the plurality of pieces of pixel data representing each display line in the display image from the memory in an order that corresponds to an order of the plurality of sets of data signal line groups associated with the arrangement order of the plurality of output terminals by the connection relationship.

7. The image signal preparation circuit according to claim 1, wherein the image signal preparation circuit is implemented as a circuit outside the integrated circuit.

8. An image signal preparation method for preparing an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the method comprising:

receiving image data representing a display image configured with a plurality of pixels to be formed by the plurality of pixel forming units, and writing the image data Into a memory that stores the image data in units of display lines; and reading a plurality of pieces of pixel data representing each display line in the display image from the memory;

wherein the drive circuit is implemented as an Integrated circuit, and a plurality of output terminals of the integrated circuit and the plurality of data signal lines are connected such that an arrangement order of the plurality of output terminals does not correspond to an arrangement order of the plurality of data signal lines, and in the reading, a serial image signal is generated by serially reading the plurality of pieces of pixel data representing each display line from the memory in an order that corresponds to an order of the plurality of data signal lines associated with the arrangement order of the plurality of output terminals by a connection relationship between the plurality of output terminals and the plurality of data signal lines, and the serial image signal is supplied to the integrated circuit.

9. The image signal preparation method according to claim 8,
wherein the plurality of output terminals respectively correspond to a plurality of sets of data signal line groups that are acquired by grouping the plurality of data signal lines, each set of which includes two or more data signal lines,
the drive circuit outputs, from each output terminal, two or more data signals to be respectively applied to two or more data signal lines in a set corresponding to the output terminal among a plurality of data signals to be applied to the plurality of data signal lines in a time division manner, and
in the reading, the serial image signal is generated by serially reading the plurality of pieces of pixel data representing each display line in the image data representing the display image from the memory in an order that, corresponds to an order of the plurality of sets of data signal line groups associated with the arrangement order of the plurality of output terminals by the connection relationship.

10. A non-transitory computer readable recording medium storing an image signal preparation program for preparing an image signal to be supplied to a drive circuit for driving a plurality of data signal lines in a display device in which the plurality of data signal lines, a plurality of scan signal lines intersecting with the plurality of data signal lines, and a plurality of pixel forming units arranged in a matrix form along the plurality of data signal lines and the plurality of scan signal lines are disposed, the program causing a computer to execute:
reading image data representing a display image configured with a plurality of pixels to be formed by the plurality of pixel forming units from an image memory that stores the image data, and outputting the image data as the image signal to be supplied to the drive circuit,
wherein the drive circuit is implemented as an integrated circuit, and a plurality of output terminals of the integrated circuit and the plurality of data signal lines are connected such that an arrangement order of the plurality of output terminals does not correspond to an arrangement order of the plurality of data signal lines, and
in the reading, the image signal to be supplied to the integrated circuit is generated as a serial image signal by serially reading the plurality of pieces of pixel data representing each display line in the display image from the image memory in an order that corresponds to an order of the plurality of data signal lines associated with the arrangement order of the plurality of output terminals by a connection relationship between the plurality of output terminals and the plurality of data signal lines.

11. The recording medium according to claim 10,
wherein the plurality of output terminals respectively correspond to a plurality of sets of data signal line groups that are acquired by grouping the plurality of data signal lines, each set of which includes two or more data signal lines,
the drive circuit outputs, from each output terminal, two or more data signals to be respectively applied to two or more data signal lines in a set corresponding to the output terminal among a plurality of data signals to be applied to the plurality of data signal lines in a time division manner, and
in the reading, the image signal to be supplied to the integrated circuit is generated as the serial image signal by serially reading the plurality of pieces of pixel data representing each display line in the image data representing the display image from the image memory in an order that corresponds to an order of the plurality of sets of data signal line groups associated with the arrangement order of the plurality of output terminals by the connection relationship.

* * * * *